United States Patent
Ito et al.

(10) Patent No.: US 6,286,087 B1
(45) Date of Patent: Sep. 4, 2001

(54) METHOD, APPARATUS, MEDIUM FOR STORING AND CONTROLLING ACCESSIBILITY TO A REMOVABLE MEDIUM

(75) Inventors: Masahiro Ito, Kawasaki; Tanaka Shigeyoshi, Higashine, both of (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/183,607

(22) Filed: Oct. 30, 1998

(30) Foreign Application Priority Data

Apr. 16, 1998 (JP) .................................................. 10-106163

(51) Int. Cl.⁷ .................................................. G06F 12/14
(52) U.S. Cl. .............................. 711/164; 711/4; 711/163; 711/111; 711/112; 711/115; 711/152
(58) Field of Search ................................ 711/4, 111, 112, 711/115, 147, 152, 163, 164; 395/186, 188.01; 705/18

(56) References Cited

U.S. PATENT DOCUMENTS

| | | | |
|---|---|---|---|
| 4,816,653 | 3/1989 | Anderl et al. | 235/380 |
| 4,947,318 * | 8/1990 | Mineo | 713/200 |
| 5,191,611 | 3/1993 | Lang | 380/25 |
| 6,012,145 * | 1/2000 | Mathers et al. | 713/202 |
| 6,085,323 * | 7/2000 | Shimizu et al. | 713/201 |
| 6,088,451 * | 7/2000 | He et al. | 380/25 |

FOREIGN PATENT DOCUMENTS

| | | |
|---|---|---|
| 152024 | 8/1985 | (EP) . |
| 4192026 | 7/1992 | (EP) . |
| 4192027 | 7/1992 | (EP) . |
| 58-178456 | 10/1983 | (JP) . |
| 59-116868 | 7/1984 | (JP) . |
| 60-189531 | 9/1985 | (JP) . |
| 62-287353 | 12/1987 | (JP) . |

* cited by examiner

Primary Examiner—Than Nguyen
(74) Attorney, Agent, or Firm—Greer, Burns & Crain Ltd

(57) ABSTRACT

When a removable medium is inserted, a medium information managing unit of a storing apparatus reads out medium information in a predetermined area and analyzes, thereby forming medium management information including access formats such as ROM, RAM, security in which a password is needed, and the like in correspondence to a plurality of partitions constructing a virtual medium by dividing an area in the medium into a plurality of data areas. When an input/output request is received from an upper apparatus, a command processing unit recognizes the access format of the target partition from the medium management information and executes a process corresponding to the access format.

15 Claims, 32 Drawing Sheets

| PARTITION INFORMATION 88 | FORMAT INFORMATION 90 | ACCESS MANAGEMENT INFORMATION 76 | |
|---|---|---|---|
| | | PASSWORD 78 | ACCESS CODE 80 |
| P 1 | F 1 | AAh | 0 0 |
| P 2 | F 2 | BBh | 0 1 |
| P 3 | F 3 | CCh | 1 0 |
| P 4 | F 4 | DDh | 1 1 |

196

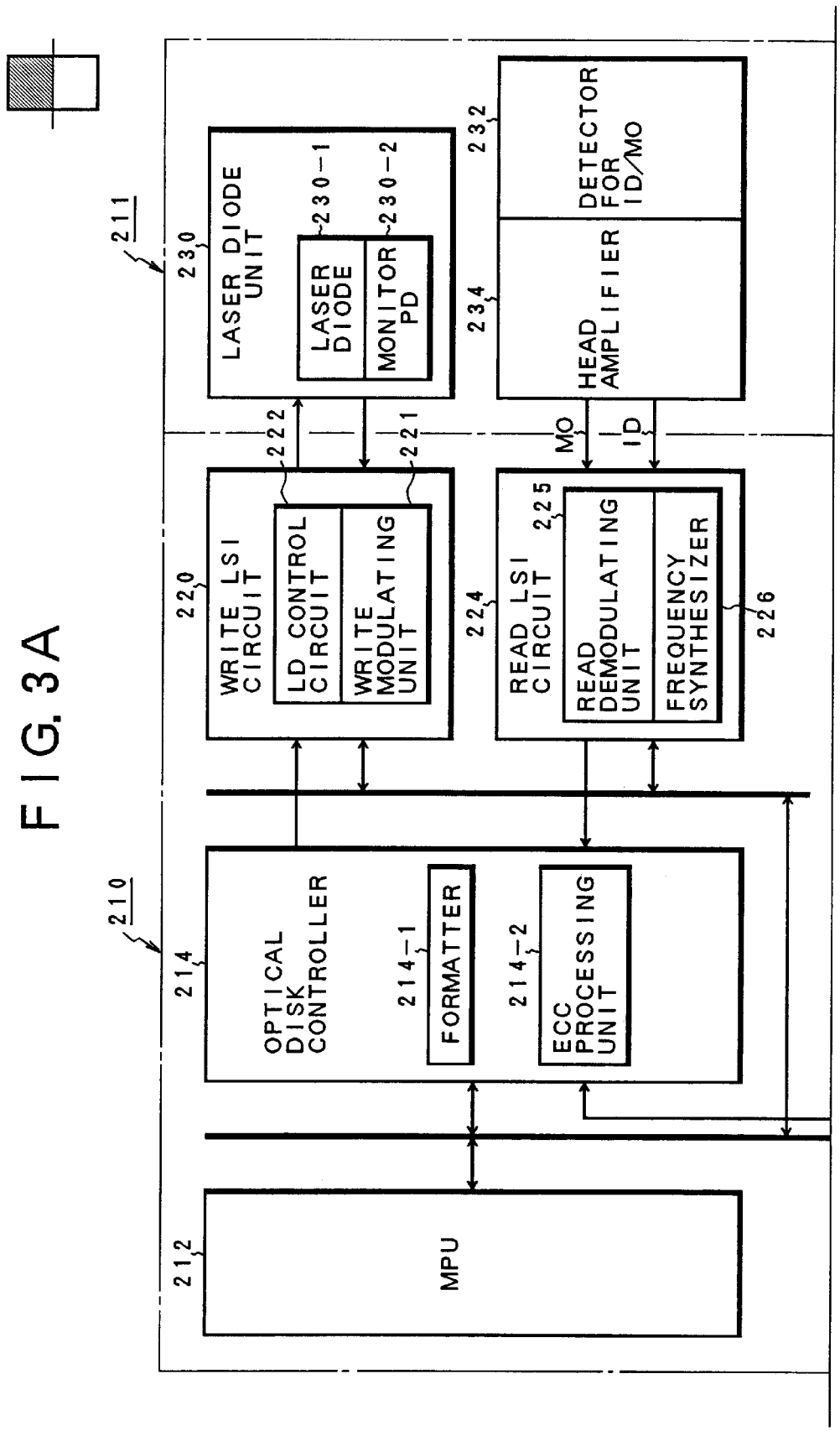

F I G. 5
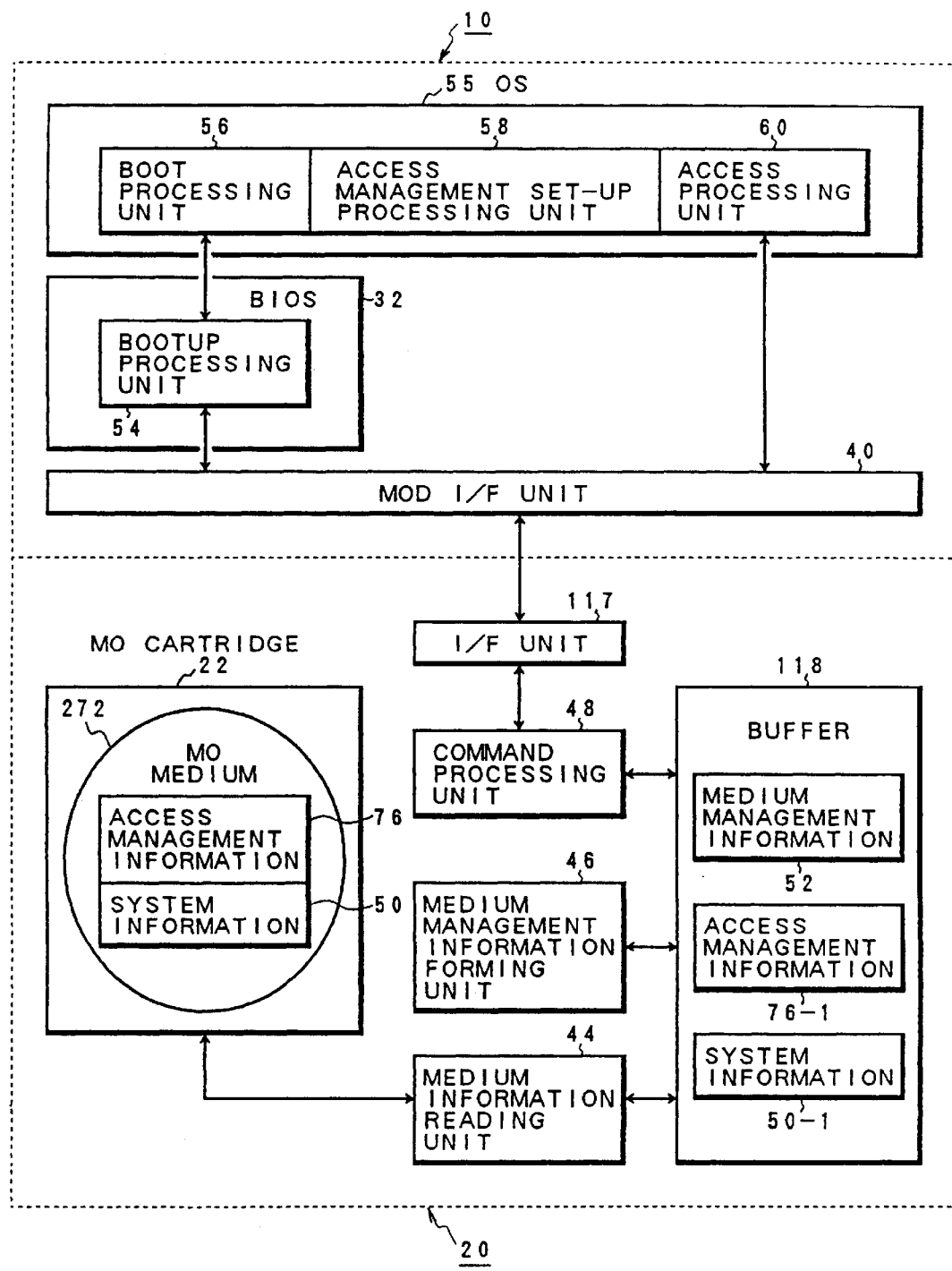

| CODE | CONTENTS |
|------|----------|
| 00h  | NON-BOOTABLE PARTITION |
| 20h  | BOOTABLE PARTITION |

| COMMAND No. (84) | FORMAT (86) |
|------------------|-------------|
| 00h | Empty |
| 01h | DOS 12-bit FAT |
| 02h | XENIX root |
| 03h | XENIX user |
| 04h | DOS 16-bit <32M |
| 05h | Extened |
| 06h | DOS 16-bit ≧32M |
| 07h | OS/2 HPFS |
| 08h | AIX |
| 09h | AIX bootable |
| 0Ah | OS/2 Boot Manag |
| 40h | Venix 80286 |
| 51h | Novell? |
| 52h | Microport |
| 63h | GNU HURD |
| 64h | Novell Netware |
| 65h | Novell Netware |
| 75h | PC/IX |
| 80h | Old MINIX |
| 81h | Linux/MINIX |
| 82h | Linux swap |
| 83h | Linux native |
| 93h | Amoeba |
| 94h | Amoeba BBT |
| A5h | BSD/386 |
| B7h | BSDI fs |
| B8h | BSDI swap |
| C7h | Syrinx |
| DBh | CP/M |
| E1h | DOS access |
| E3h | DOS R/O |
| F2h | DOS secondary |
| FFh | BBT |

FIG. 10

| PARTITION INFORMATION 88 | FORMAT INFORMATION 90 | BOOTABLE INFORMATION 92 | ACCESS MANAGEMENT INFORMATION 76 ||
|---|---|---|---|---|
| | | | PASSWORD 78 | ACCESS CODE 80 |
| P1 | F1 | B1 | AAh | 00 |
| P2 | F2 | B2 | BBh | 01 |
| P3 | F3 | B3 | CCh | 10 |
| P4 | F4 | B4 | DDh | 11 |

52

| CODE | CONTENTS | CODE NAME |
|------|----------|-----------|
| 01 | READABLE/WRITABLE | RAM CODE |
| 10 | READABLE/WRITABLE | ROM CODE |
| 11 | ACCESS INHIBITION | SECURITY CODE |

FIG. 13A 100 PASSWORD REGISTRATION COMMAND

| COMMAND CODE | PARTITION ADDRESS | PASSWORD |
|---|---|---|
| 102 | 104 | 106 |

FIG. 13B 105 ACCESS CODE REGISTRATION COMMAND

| COMMAND CODE | PARTITION ADDRESS | PASSWORD | ACCESS CODE |
|---|---|---|---|
| 108 | 104 | 106 | 110 |

FIG. 13C 112 PASSWORD CHANGE COMMAND

| COMMAND CODE | PARTITION ADDRESS | OLD PASSWORD | NEW PASSWORD |
|---|---|---|---|
| 114 | 104 | 106-1 | 106-2 |

FIG. 13D 116 ACCESS CODE CHANGE COMMAND

| COMMAND CODE | PARTITION ADDRESS | PASSWORD | ACCESS CODE |
|---|---|---|---|
| 121 | 104 | 106 | 110 |

FIG. 13E 120 PASSWORD ERASING COMMAND

| COMMAND CODE | PARTITION ADDRESS | PASSWORD |
|---|---|---|
| 122 | 104 | 106 |

FIG. 13F 124 ACCESS CODE ERASING COMMAND

| COMMAND CODE | PARTITION ADDRESS | PASSWORD |
|---|---|---|
| 126 | 104 | 106 |

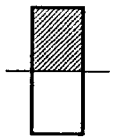
FIG. 14A
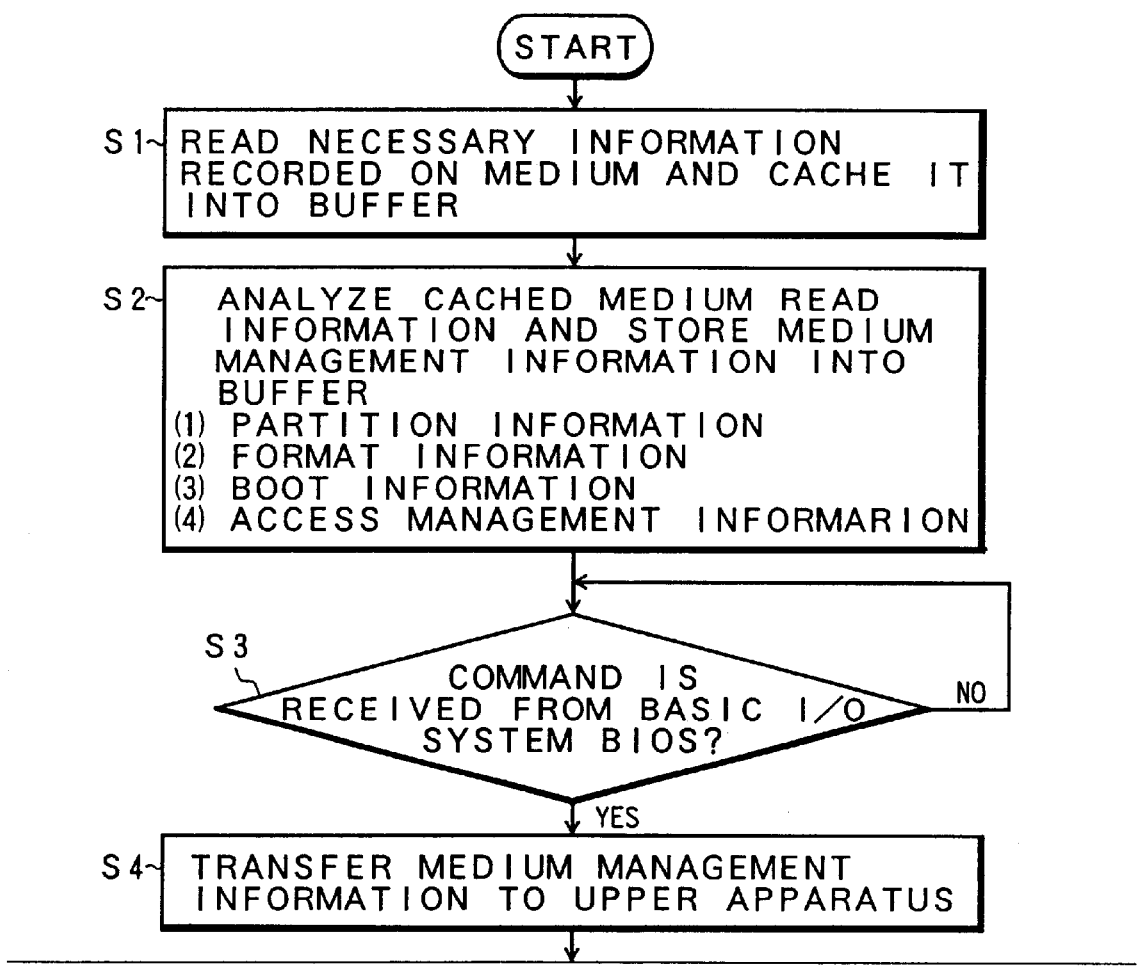

FIG. 14B
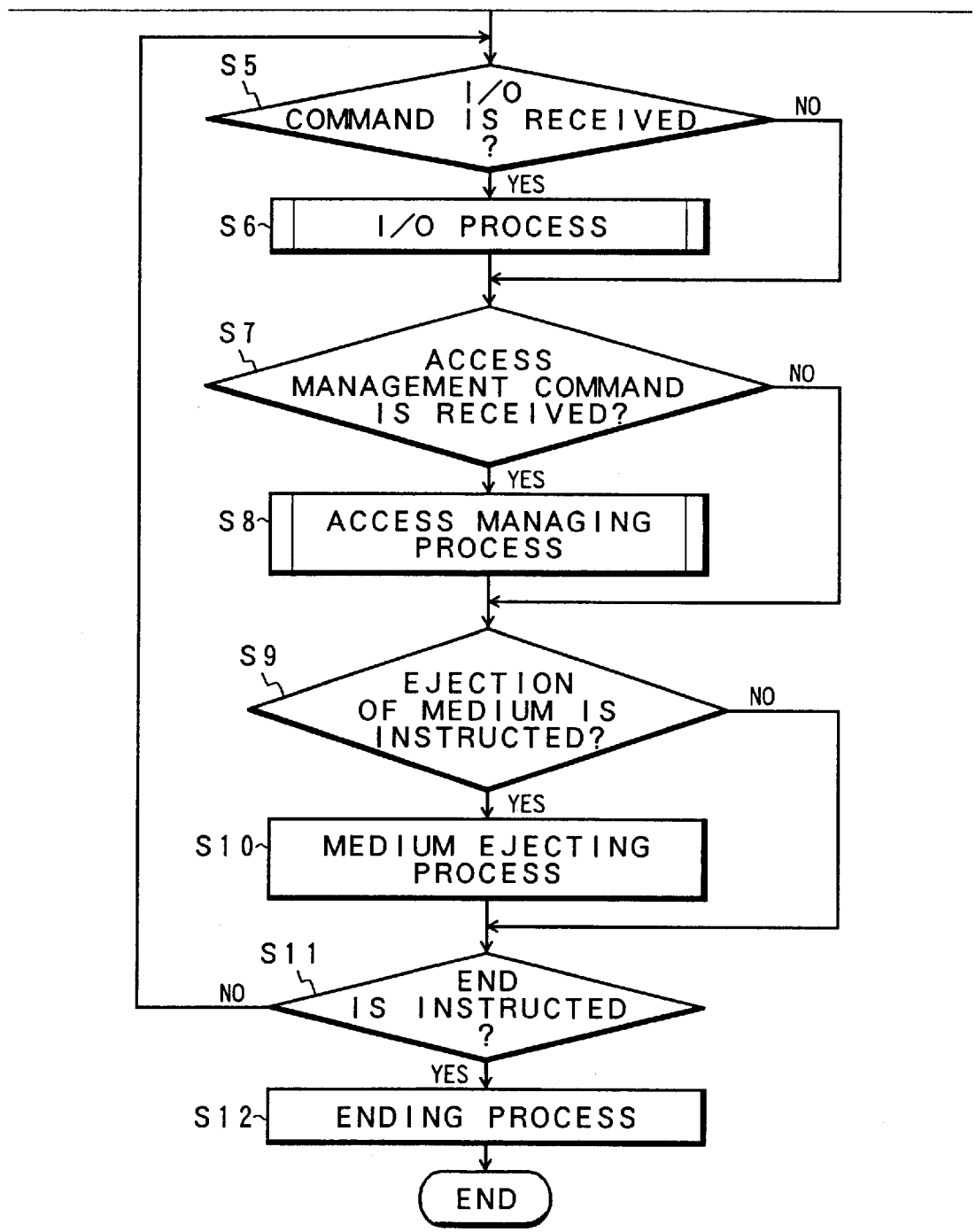

F I G. 1 5
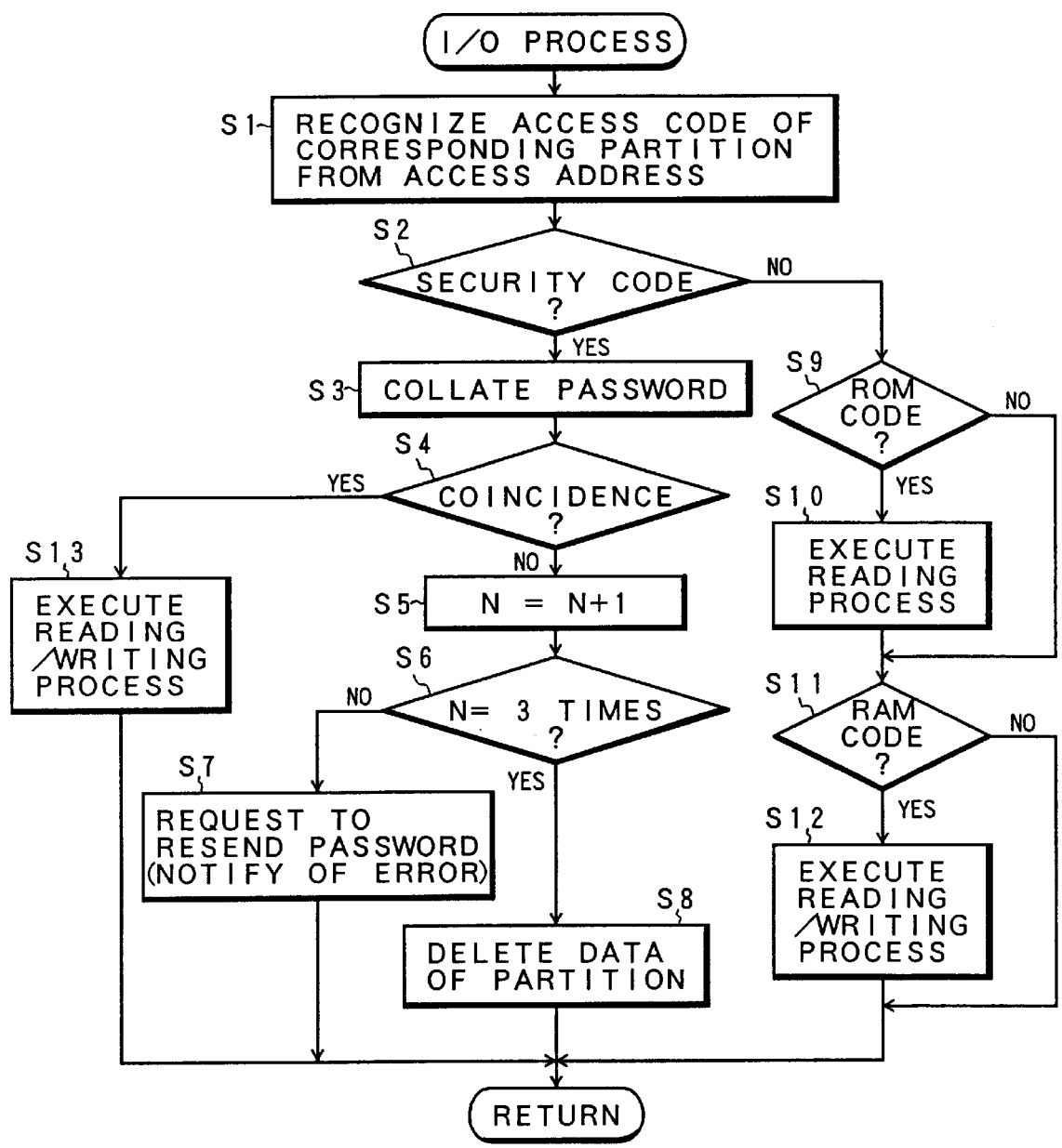

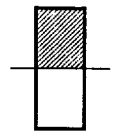
FIG. 18A
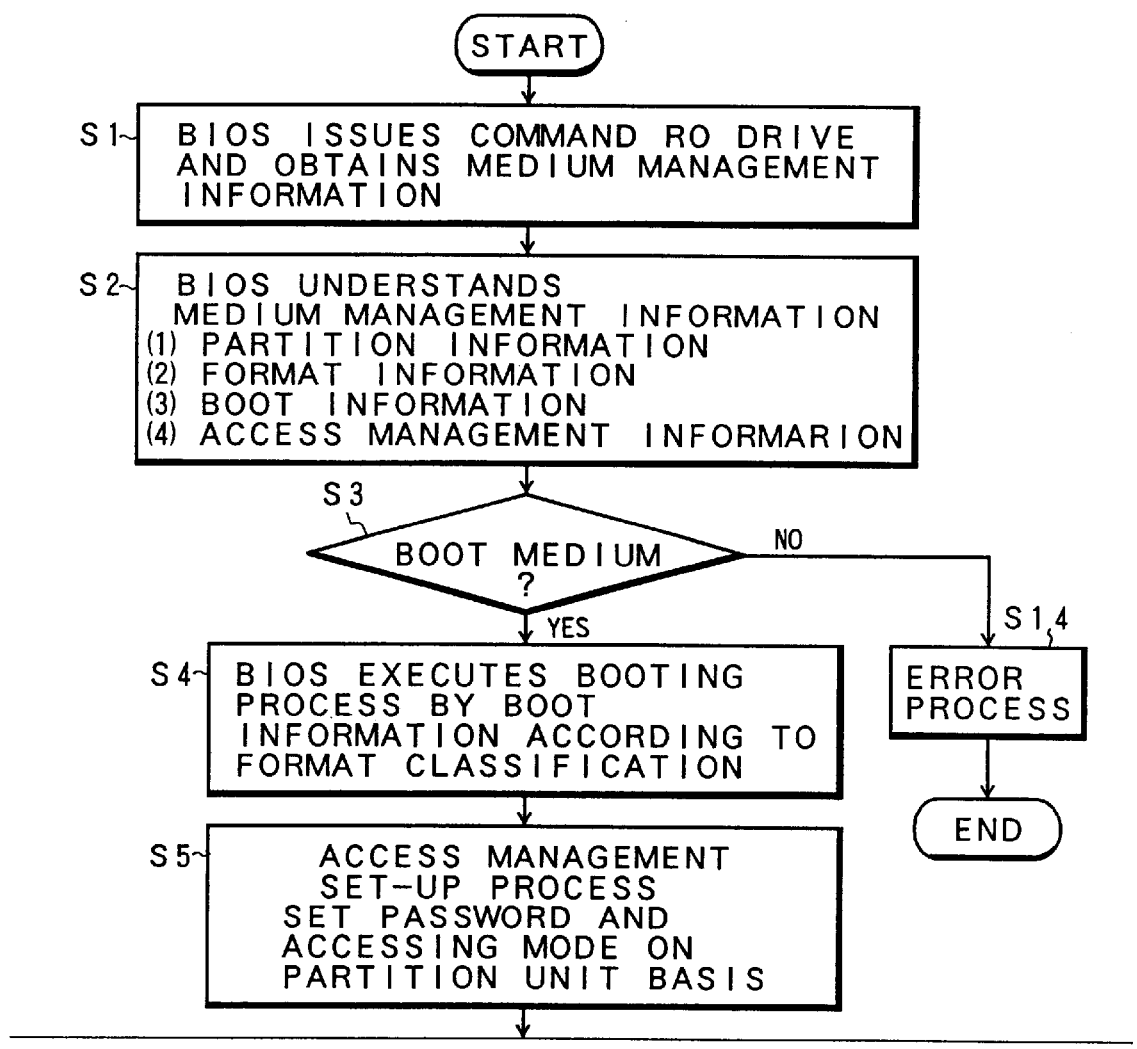

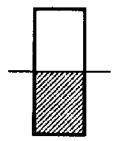
FIG. 18B
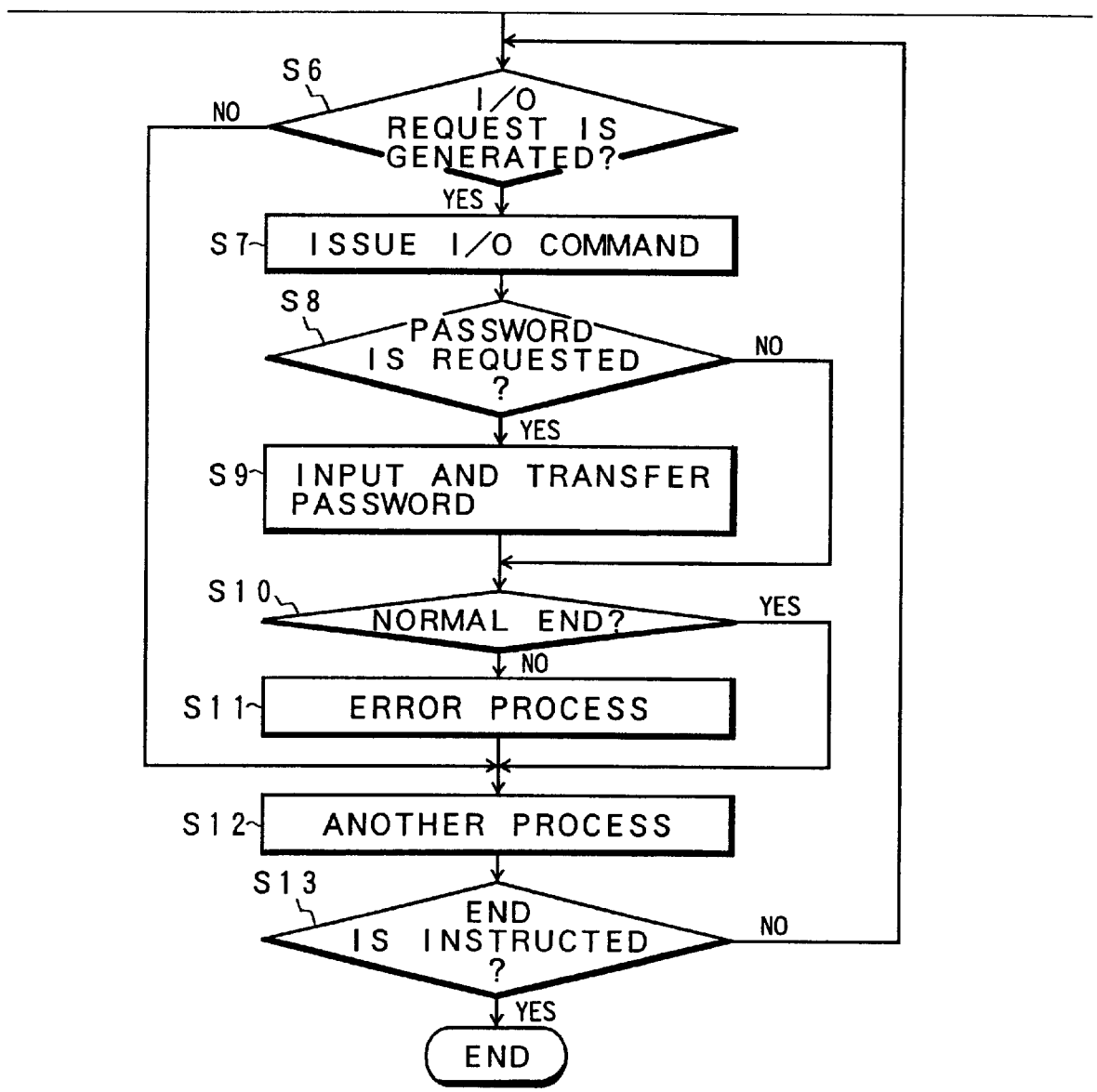

| — | MEDIUM MANAGEMENT SET-UP PICTURE PLANE |

DESIGNATE PARTITION    1 ■    2 ☐    3 ☐    4 ☐

134     134-1

136 PASSWORD

- ☐ REGISTER PASSWORD
- ■ CHANGE PASSWORD
- ☐ ERASE PASSWORD

144

INPUT PASSWORD BEFORE CHANGE
| 1 | 2 | 3 | 4 |  —146-1

INPUT PASSWORD AFTER CHANGE
| 5 | 6 | 7 | 8 |  —146-2

[ EXECUTE ]    [ CANCEL ]

148

138 ACCESS CODE

- ☐ REGISTER ACCESS CODE
- ☐ CHANGE ACCESS CODE
- ☐ ERASE ACCESS CODE

ACCESS CLASSIFICATION
- ☐ ROM CODE
- ☐ RAM CODE
- ☐ SECURITY CODE

[ EXECUTE ]    [ CANCEL ]

132
```
MEDIUM MANAGEMENT SET-UP PICTURE PLANE
```

DESIGNATE PARTITION   1 ■   2 □   3 □   4 □
134                      134-1

136 PASSWORD                    ACCESS CODE 138

☐ REGISTER PASSWORD           ☐ REGISTER ACCESS CODE
☐ CHANGE PASSWORD             ☐ CHANGE ACCESS CODE
■ ERASE PASSWORD              ■ ERASE ACCESS CODE
145                           155

ACCESS
                         156  CLASSIFICATION
INPUT PASSWORD
  TO BE ERASED                ■ NORMAL CODE
146─| 1 | 2 | 3 | 4 |         ☐ ROM CODE
                              ☐ RAM CODE
                              ☐ SECURITY CODE

| EXECUTE |  | CANCEL |       | EXECUTE |  | CANCEL |
    148                           164

| PARTITION INFORMATION 88 | FORMAT INFORMATION 90 | ACCESS MANAGEMENT INFORMATION 76 | |
|---|---|---|---|
| | | PASSWORD 78 | ACCESS CODE 80 |
| P1 | F1 | AAh | 00 |
| P2 | F2 | BBh | 01 |
| P3 | F3 | CCh | 10 |
| P4 | F4 | DDh | 11 |

196

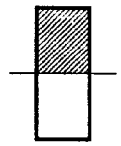
FIG. 29A
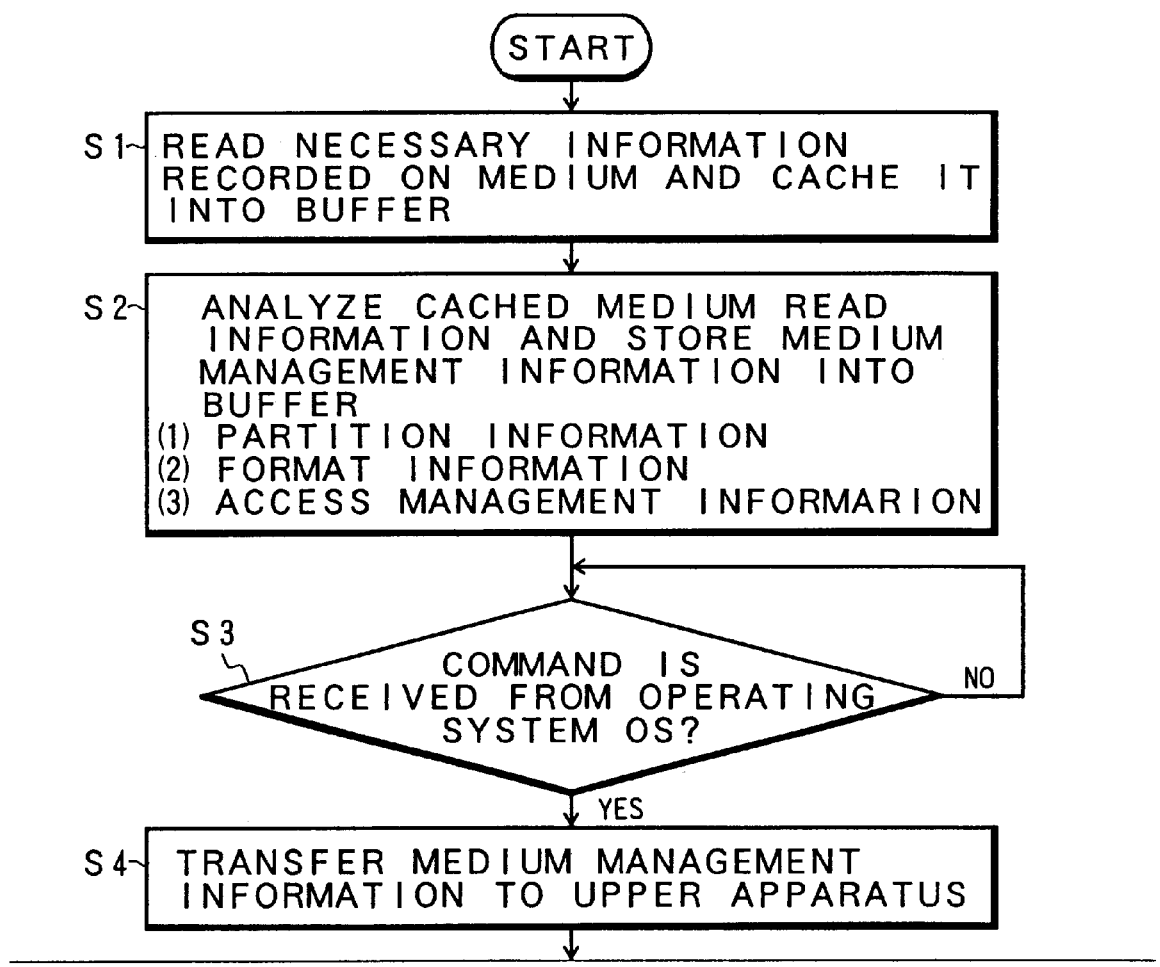

METHOD, APPARATUS, MEDIUM FOR STORING AND CONTROLLING ACCESSIBILITY TO A REMOVABLE MEDIUM

BACKGROUND OF THE INVENTION

1. Field of the Invention

The invention relates to a storing apparatus using a storing medium such as optical disk, magnetic disk, floppy disk, or the like, a storage control method, and a storing medium. More particularly, the invention relates to a storing apparatus for allowing firmware on the side of a storing apparatus to manage an accessing function of a storing medium by a password which is inputted by the user, a storage control method, and a storing medium.

2. Description of the Related Arts

In recent years, storing apparatuses using various removable media such as magnetic tape apparatus, CD drive, DVD drive, MO drive, floppy disk apparatus, large capacity floppy apparatus, and the like which can be used in various computer apparatuses, a television, a video, and the like have been put into practical use. As for the storing apparatus using such a removable medium, since data in the medium can be referred, changed, or copied everywhere so long as the medium and the apparatus exist, there is a problem such that security of data in the medium cannot be maintained.

In a security system for maintaining the security of data of an input/output apparatus such as a disk drive or the like, a security function is provided for the OS of an upper apparatus, thereby managing an access to the input/output apparatus. That is, according to a security program of the OS, the user is allowed to set a password which is used to permit the access to the input/output apparatus by a set-up menu and, when data in a file or the like is preserved to a medium of the input/output apparatus, the password set by the user is written into a predetermined area of the medium by using a normal write command. When the user accesses the file in the medium after completion of the preservation, the user is requested to input the password and the password inputted by the user is collated with the password read out from the medium. When the coincidence of the collation of the password is obtained, the access to the file in the medium is permitted. When the password is different, the access to the file is inhibited. According to the security system as mentioned above, an illegal access to the input/output apparatus by the third person who does not know the password is inhibited, so that the security of data can be held.

In the storing apparatus such as a magnetooptic disk drive or the like using the removable medium, however, since the password of the medium can be read or written by a normal read/write command in the security system provided by the OS, it is difficult to sufficiently assure the security of data. That is, in the security system provided by the OS, since the position of the password for the file preserved in the medium is known, the password can be relatively easily illegally checked, changed, or erased by using the normal read/write command, so that the security of the data cannot be sufficiently assured. Although the removable medium can be ordinarily written and read out, depending on the file which is preserved, there is a case where it is desired that the writing after completion of the preservation is inhibited and only the reading is executed. However, the using method such that the writing of data in the medium is inhibited and only the reading is permitted is performed on a medium unit basis in accordance with physical shapes of opening portions formed in, for example, functional areas FA1 and FA2 of an MO cartridge. Consequently, there is an inconvenience such that the accessing form in which the writing and reading are permitted, the form in which the writing is inhibited and the reading is permitted, and the form in which the writing and reading are inhibited cannot be managed as necessary with respect to a plurality of data in the medium. In recent years, particularly, MO cartridge media having large capacities such as 540 MB and 640 MB have been put into practical use. In a manner similar to a hard disk, a method whereby one medium area is divided into a plurality of data areas called partitions and one partition logically distinguished as one virtual medium and is used has been adopted. As mentioned above, in the removable medium of a hard disk type having the partitions, if a different accessing form can be used every partition, it is extremely convenient.

SUMMARY OF THE INVENTION

According to the invention, there is provided a storing apparatus in which security of data preserved in a storing medium is improved and, when an area in the medium is divided into a plurality of data areas, a different access form can be selected every area.

The invention relates to a storing apparatus using, for example, a removable medium as a storing medium. According to the invention, the storing apparatus has functions of a medium information reading unit, a medium management information forming unit, and a command processing unit which are constructed by firmware of the storing apparatus. When the removable medium is inserted, the medium information reading unit reads out system information and access management information from a predetermined area of the removable medium. The medium management information forming unit forms medium management information including a password and/or an access kind code which is used to permit the access to each data area into a memory by the system information and the access management information so as to correspond to a plurality of logically divided data areas in the removable medium. When an access request command is received from, for example, an upper apparatus, the command processing unit discriminates the permission or inhibition of the access for an address and the kind of access of the access request command with reference to the medium management information. When it is possible to access, the command processing unit executes the access request command. When it is impossible to access, the command processing unit reports an error. In this instance, the system information has been recorded in a predetermined logic block address in the data area in the removable medium. The access management information has been recorded in an area which cannot be shown by the logic block address except for the user area of the removable medium. The access kind code is any one of a read access code to permit only the read access, a read/write access code to permit both of the read access and the write access, and a security code to permit the access only when the collation coincidence of passwords is derived. According to the storing apparatus of the invention as mentioned above, the kinds of accesses are managed as medium management information in correspondence to a plurality of data areas, for example, partitions in the removable medium. Consequently, even when the password which is used for the security access is illegally obtained, the security cannot be cancelled unless the correspondence relation such that the password belongs to which partition in the medium is known, so that further higher security of data can be assured as compared with a case where the security of the whole medium is held. The management of each access kind of all of the reading, reading/writing, and security corresponding to the data areas in the medium is performed on the storing apparatus side, so that a burden on the upper apparatus regarding the access management of the medium can be fairly reduced.

Further, even in the same medium, different access forms such as

I. read access of write inhibition and read permission

II. write/read access of the write permission and read permission

III. security access which needs a password can be arbitrarily determined as necessary in dependence on the data area. The optimum medium management according to the contents of data to be recorded can be performed. When the received password coincides with the password in the designated data area in the medium management information, the command processing unit updates the access kind code in the medium management information. As for the access management information on the removable medium, the password and the access kind code are previously recorded every data area. When a new access kind code is received together with the password from the upper apparatus, in the case where the password coincides with the password in the designated data area, the command processing unit updates the access kind code in the access management information recorded in the removable medium. A flag is further added to a security code stored in the access management information in the removable medium. By the flag, either one of a password indispensable mode in which the password is necessary every access and an initial password mode in which the password is needed in only the first access and no password is necessary in the second and subsequent times can be selected. When the collation coincidence of the received password is not obtained, the command processing unit erases the data area. Consequently, leakage of data by the illegal access is certainly prevented. When the medium is ejected or a power source of the apparatus is turned off, the medium management information forming unit clears the medium management information formed in the memory. The leakage which is caused since the medium management information in which the passwords corresponding to the data areas have been registered remains in the storing apparatus is prevented. The medium management information forming unit divides the medium area into one or a plurality of partitions and forms the medium management information. As medium management information, the medium management information forming unit further forms bootable information indicative of the presence or absence of a boot program necessary for a boot process of the apparatus and format information indicative of the kind of format of each data area. Consequently, any special operation such as a reading analysis or the like of the medium is not needed in the upper apparatus and the boot information and the format information of each data area can be provided to the upper apparatus, so that the upper apparatus can be easily made correspond to various kinds of formats on the medium side.

According to the invention, there is provided a storage control method in which the security of data preserved in the storing medium is improved and, when an area in the medium is divided into a plurality of data areas, a different access form can be selected every area. The storage control method is performed by a procedure comprising:

a medium information reading step of reading out system information and access management information from a predetermined area of a removable medium when the removable medium is inserted;

a medium management information forming step of forming medium management information including a password and/or an access kind code which is used to permit an access to each data area into a memory in correspondence to a plurality of logically divided data areas in the removable medium by the system information and the access management information; and a command processing step of, when an access request command is received, discriminating whether the access is permitted or not with respect to the address and access kind of the access request command with reference to the medium management information, executing the access request command when the access can be performed, and reporting an error when it is impossible.

The details of the storage control method are also fundamentally substantially the same as those of the storing apparatus.

According to the invention, there is also provided a storing medium itself. A system information area in which system information including information logically divided into a plurality of data areas is recorded and an access management information area in which access management information including a password and an access kind code which are used to permit an access to each data area is recorded are stored in the storing medium. The access kind code in the access management information is any one of a read access code for permitting only a read access, a read/write access code for permitting both of the read access and a write access, and a security code for permitting the access only in the case where a collation coincidence of the password is obtained. The system information also includes information obtained by dividing the medium area into one or plurality of partitions.

The above and other objects, features, and advantages of the present invention will become more apparent from the following detailed description with reference to the drawings.

BRIEF DESCRIPTION OF THE DRAWINGS

FIGS. 3A and 3B are block diagrams of an MO drive in FIG. 2;

FIG. 5 is a functional block diagram of the drive built-in type apparatus in FIG. 1;

FIG. 8 is an explanatory diagram of a boot indicator in FIG. 7;

FIG. 9 is an explanatory diagram of a format table in which command numbers and format names have been defined and which is stored in a system indicator in FIG. 7;

FIG. 10 is an explanatory diagram of medium management information which is formed on the drive side in FIG. 5;

FIGS. 13A to 13F are explanatory diagrams of access management commands which are used for setting passwords and access codes;

FIGS. 14A and 14B are flowcharts for a processing operation of an MO drive in FIG. 5;

FIG. 15 is a flowchart for an inputting/outputting process on the drive side in FIGS. 14A and 14B;

FIGS. 18A and 18B are flowcharts for processing operations of the BIOS and OS on the upper side in FIG. 5;

FIG. 20 is an explanatory diagram of a changing operation by the medium management set-up picture plane in FIGS. 18A and 18B;

FIG. 21 is an explanatory diagram of an erasing operation by the medium management set-up picture plane in FIGS. 18A and 18B;

FIGS. 29A and 29B are flowcharts for a processing operation of an MO drive in FIG. 24.

DETAILED DESCRIPTION OF THE PREFERRED EMBODIMENTS

[Drive Built-in Type]

Figure 1:
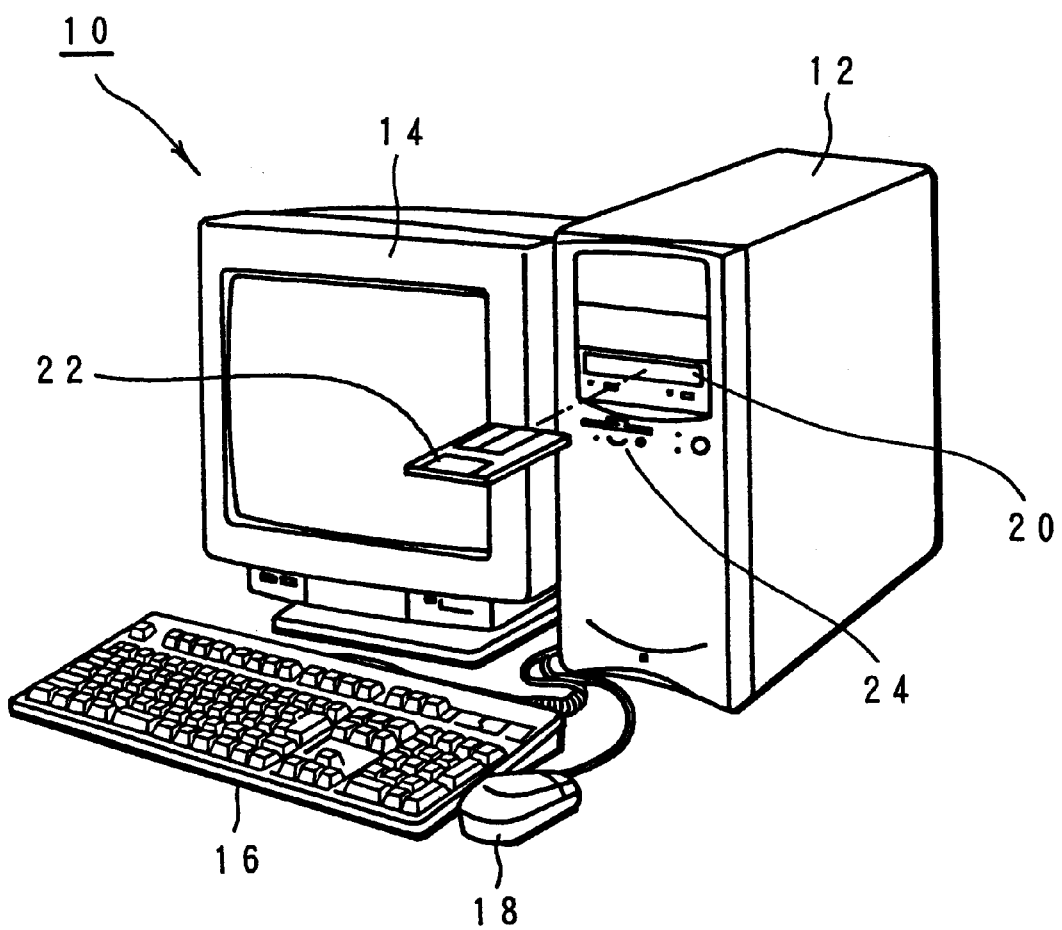
FIG. 1 is an explanatory diagram of a construction of an apparatus of a drive built-in type.

FIG. 1 is an explanatory diagram of a storing system using a storing apparatus of a removable medium of the invention. An integrated type in which a magnetooptic disk drive is built in an upper apparatus is shown as an example of the storing apparatus. A personal computer 10 is constructed by a personal computer main body 12, a display 14, a keyboard 16, and a mouse 18. An MO drive (magnetooptic disk drive) 20 is built in the personal computer main body 12. An MO cartridge 22 serving as a removable medium is inserted and an access for recording and reproduction is executed. An FD drive (floppy disk drive) 24 using a floppy disk as a removable medium is also provided for the personal computer main body 12.

Figure 2:
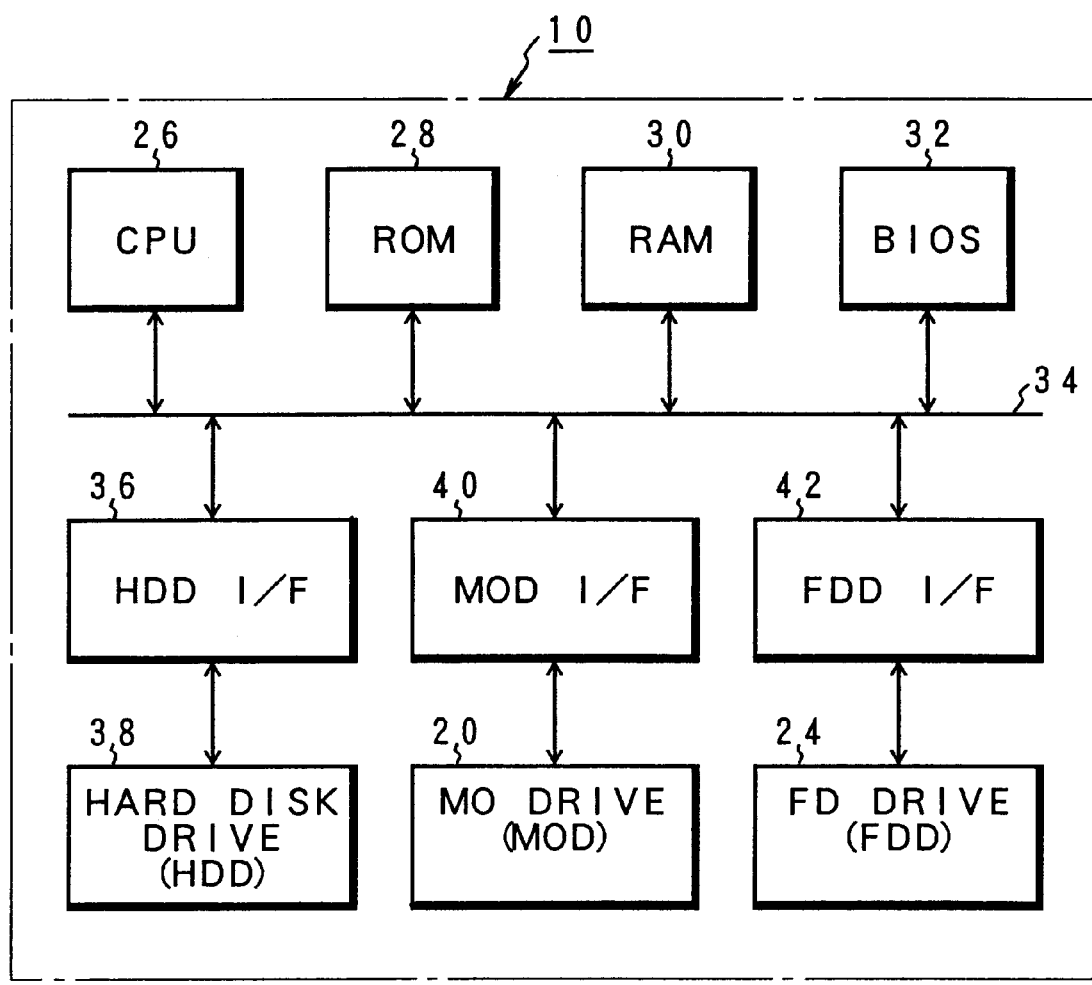
FIG. 2 is a block diagram of a hardware construction of FIG. 1.

FIG. 2 is a block diagram of a hardware construction of the personal computer 10 in FIG. 1. A CPU 26 is provided for the personal computer 10. A ROM 28 in which programs have been stored, a RAM 30 which operates as a main storage, and a BIOS 32 known as a basic input/output system are connected to a bus 34 of the CPU 26. A hard disk drive 38 is connected to the bus 34 through an HDD interface 36, the MO drive 20 is connected through an MOD interface 40, and the FD drive 24 is further connected through an FDD interface 42, respectively. Although the MO drive 20 and FD drive 24 built in the personal computer 10 are recording and reproducing apparatuses using removable media, the MO drive 20 will now be described as an example of a removable apparatus as a target of the invention in the embodiment.

Figure 3B:
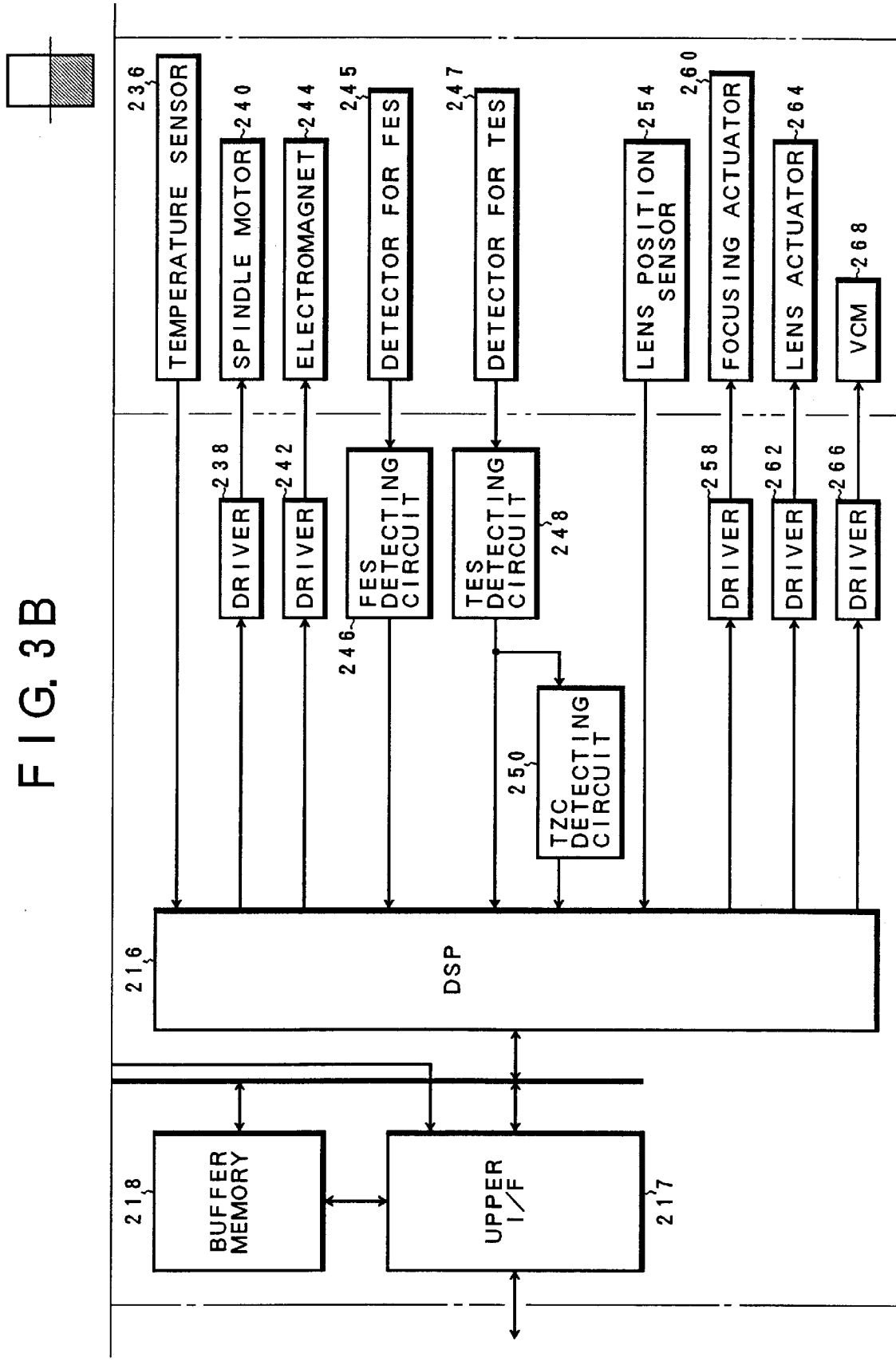

FIGS. 3A and 3B are block diagrams of the MO drive 20 built in the personal computer 10 in FIG. 2. The MO drive of the invention is constructed by a control unit 210 and an enclosure 211. An MPU 212 to control the whole optical disk drive, an interface 217 for transmitting and receiving commands and data to/from the upper apparatus, an optical disk controller (ODC) 214 to perform processes which are necessary for reading and writing data to/from the optical disk medium, a DSP 216, and a buffer memory 218 are provided for the control unit 210. The buffer memory 218 is shared by the MPU 212, optical disk controller 214, and upper interface 217. A formatter 214-1 and an ECC processing unit 214-2 are provided for the optical disk controller 214. At the time of write access, the formatter 214-1 divides NRZ write data on a sector unit basis of the medium, thereby forming a recording format. The ECC processing unit 214-2 forms an ECC code on a sector write data unit basis and adds and, if necessary, forms a CRC code. Further, sector data after completion of an ECC encoding is converted into, for example, a 1-7 RLL code. At the time of read access, sector read data is 1-7 RLL inversely converted. Subsequently, after a CRC check was performed by the ECC processing unit 214-2, an error detection and correction are performed. Further, the NRZ data of the sector unit is coupled by the formatter 214-1 and the resultant data is transferred as a stream of NRZ read data to the upper apparatus. A write LSI circuit 220 is provided for the optical disk controller 214. A write modulating unit 221 and a laser diode control circuit 222 are provided for the write LSI circuit 220. A control output of the laser diode control circuit 222 is supplied to a laser diode unit 230 provided for the optical unit on the enclosure 211 side. The laser diode unit 230 integratedly has a laser diode 230-1 and a detector 230-2 for monitoring. The write modulating unit 221 converts the write data into a data format of the PPM recording or PWM recording (also referred to as a mark recording or an edge recording). As an optical disk for recording and reproducing by using the laser diode unit 230, namely, as a rewritable MO cartridge medium, in the embodiment, any one of the media of 128 MB, 230 MB, 540 MB, and 640 MB can be used. Among them, as for the MO cartridge medium of 128 MB, the pit position recording (PPM recording) for recording data in correspondence to the presence or absence of a mark on the medium is used. The recording format of the medium is based on the zone CAV and the number of zones of a user area is equal to one zone in case of the 128 MB medium. With respect to the MO cartridge media of 230

MB, 540 MB, and 640 MB to perform a high density recording, the pulse width recording (PWM recording) in which edges of the mark, namely, a leading edge and a trailing edge, are made corresponding to the data, is used. A difference between storage capacities of the 640 MB medium and the 540 MB medium depends on a difference between sector capacities. When the sector capacity is equal to 2048 bytes, the storage capacity is equal to 640 MB. When the sector capacity is equal to 512 bytes, the storage capacity is equal to 540 MB. A recording format of the medium is the zone CAV. The number of zones of the user area is equal to 10 zones in case of the 230 MB medium, 18 zones in case of the 540 MB medium, and 11 zones in case of the 640 MB medium. As mentioned above, the optical disk drive of the invention can cope with the MO cartridges of the storage capacities of 128 MB, 230 MB, 540 MB, and 640 MB and, further, can cope with the MO cartridges of the storage capacities of 230 MB, 540 MB, and 640 MB corresponding to the direct overwriting type. When the MO cartridge is loaded to the optical disk drive, therefore, an ID portion of the medium is first read, the kind of medium is recognized from a pit interval by the MPU 212, and the kind as a recognition result is notified to the optical disk controller 214.

As a reading system for the optical disk controller 214, a read LSI circuit 224 is provided and a read demodulating unit 225 and a frequency synthesizer 226 are built in the read LSI circuit 224. A photosensing signal of the return light of a beam from the laser diode 230-1 by a detector 232 for ID/MO provided in the enclosure 211 is inputted as an ID signal and an MO signal to the read LSI circuit 224 through a head amplifier 234. Circuit functions of an AGC circuit, a filter, a sector mark detecting circuit, and the like are provided for the read demodulating unit 225 of the read LSI circuit 224. A read clock and read data are formed by the inputted ID signal and MO signal. PPM data or PWM data is demodulated to the original NRZ data. Since the zone CAV is used, a setting control of a frequency dividing ratio for generating a clock frequency corresponding to the zone from the MPU 212 to the frequency synthesizer 226 built in the read LSI circuit 224 is executed. The frequency synthesizer 226 is a PLL circuit having a programmable frequency divider and generates a reference clock, as a read clock, having a predetermined peculiar frequency according to the zone position of the medium. That is, the frequency synthesizer 226 is constructed by a PLL circuit having a programmable frequency divider. In accordance with the following equation, the frequency synthesizer generates a reference clock of a frequency (fo) according to a frequency dividing ratio (m/n) set by the MPU 212 in response to the zone number.

$$fo = (m/n) \cdot fi$$

where, a frequency division value (n) of a denominator of the frequency dividing ratio (m/n) is a peculiar value according to the kind of medium of 128 MB, 230 MB, 540 MB, or 640 MB. A frequency division value (m) of a numerator is a value which varies in accordance with the zone position of the medium and has been prepared as table information of the value corresponding to the zone number with respect to each medium. The read data demodulated by the read LSI circuit 224 is supplied to the reading system of the optical disk controller 214 and is subjected to a CRC check and an ECC process by an encoding function of the ECC processing unit 214-2 after completion of the 1-7 RLL inverse conversion, so that NRZ sector data is reconstructed.

Subsequently, the NRZ sector data is converted to a stream of the NRZ read data coupled with the NRZ sector data by the formatter 214-1. This data stream is transferred to the upper apparatus via the buffer memory 218 by the upper interface 217.

A detection signal of a temperature sensor 236 provided on the enclosure 211 side is supplied to the MPU 212 via the DSP 216. On the basis of an environmental temperature in the apparatus detected by the temperature sensor 236, the MPU 212 controls each of the light emitting powers for reading, writing, and erasing in the laser diode control circuit 222 to an optimum value. The MPU 212 controls a spindle motor 240 provided on the enclosure 211 side by a driver 238 via the DSP 216. Since the recording format of the MO cartridge is the zone CAV, the spindle motor 240 is rotated at a constant velocity of, for example, 3000 rpm. The MPU 212 also controls an electromagnet 244 provided on the enclosure 211 side through a driver 242 via the DSP 216. The electromagnet 244 is arranged on the side opposite to the beam irradiating side of the MO cartridge loaded in the apparatus and supplies an external magnetic field to the medium upon recording and erasing. The DSP 216 has a servo function to position the beam from the laser diode unit 230 for the medium and functions as a seek control unit and an on-track control unit for seeking and on-tracking an optical pickup so as to reach a target track. The seek control and the on-track control can be simultaneously executed in parallel with the write access or read access responsive to an upper command by the MPU 212. To realize the servo function of the DSP 216, a detector 245 for FES to receive the beam return light from the medium is provided for the optical unit on the enclosure 211 side. An FES detecting circuit (focusing error signal detecting circuit) 246 forms a focusing error signal E1 from a photosensing output of the detector 245 for FES and supplies it to the DSP 216. A detector 247 for TES to receive the beam return light from the medium is provided for the optical unit on the enclosure 211 side. A TES detecting circuit (tracking error signal detecting circuit) 248 forms a tracking error signal E2 from a photosensing output of the detector 247 for TES and supplies it to the DSP 216. The tracking error signal E2 is inputted to a TZC detecting circuit (track zero-cross point detecting circuit) 250, by which a track zero-cross pulse E3 is formed and inputted to the DSP 216. A lens position sensor 252 to detect the lens position of an objective lens for irradiating the laser beam to the medium is provided on the enclosure 211 side. A lens position detection signal (LPOS) E4 from the lens position sensor is inputted to the DSP 216. Further, to control the position of the beam spot on the medium, the DSP 216 controls a focusing actuator 260, a lens actuator 264, and a VCM 268 through drivers 258, 262, and 266, respectively.

Figure 4:
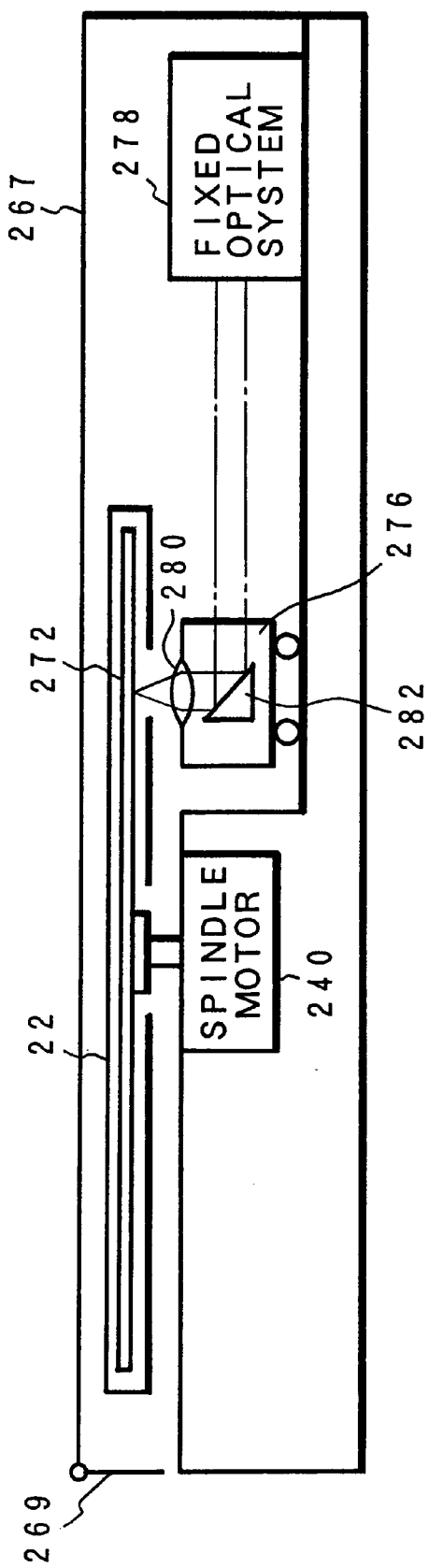
FIG. 4 is an explanatory diagram of an internal structure of the apparatus in FIGS. 3A and 3B.

An outline of the enclosure 211 in the optical disk drive is as shown in FIG. 4. The spindle motor 240 is provided in a housing 267. By inserting the MO cartridge 22 from an inlet door 269 side to a hub of a rotary shaft of the spindle motor 240, a loading such that an MO medium 272 in the cartridge is attached to the hub of the rotary shaft of the spindle motor 240 is executed. A carriage 276 which is movable in such a direction as to transverse tracks of the medium by the VCM 268 is provided under the MO medium 272 of the loaded MO cartridge 22. An objective lens 280 is attached in the upper portion of the carriage 276. The beam from the laser diode provided for a fixed optical system 278 is inputted to the objective lens through a leading mirror 282, thereby forming the beam spot as an image onto the medium surface of the MO medium 272. The objective lens 280 is moved in the optical axial direction by the focusing actuator 260 provided in the enclosure 211 in FIGS. 3A and 3B. The objective lens can be also moved in the radial direction which transverses the tracks of the medium within a range of, for example, tens of tracks by the lens actuator 264. The position of the objective lens 280 attached to the carriage 276 is detected by a lens position sensor 254 in FIGS. 3A and 3B. The lens position sensor 254 sets the lens position detection signal to zero at the neutral position where the optical axis of the objective lens 280 is directed right above and generates the lens position detection signal E4 according to a movement amount and having different polarities for the movement to the outer side and the movement to the inner side.

FIG. 5 is a functional block diagram of a storing system of the invention in a personal computer having therein the MO drive 20 in FIG. 4. First, the MO medium 272 built in the MO cartridge 22 is inserted into the MO drive 20. When a power source of the apparatus provided for the personal computer 10 is turned on, a power source is also supplied to the MO drive 20 built in the personal computer main body 12 as shown in FIG. 1. The functions of a medium information reading unit 44, a medium management information forming unit 46, and a command processing unit 48 are realized by a program control of the MPU 212 of the control unit 210 shown in FIGS. 3A and 3B. When the power source of the apparatus of the personal computer 10 is turned on, the medium information reading unit 44 reads out system information 50 and access management information 76 of the MO medium 272 inserted in the MO drive 20 by the MO cartridge 22 and caches them as system information 50-1 and access management information 76-1 into a buffer 118.

Figure 6:
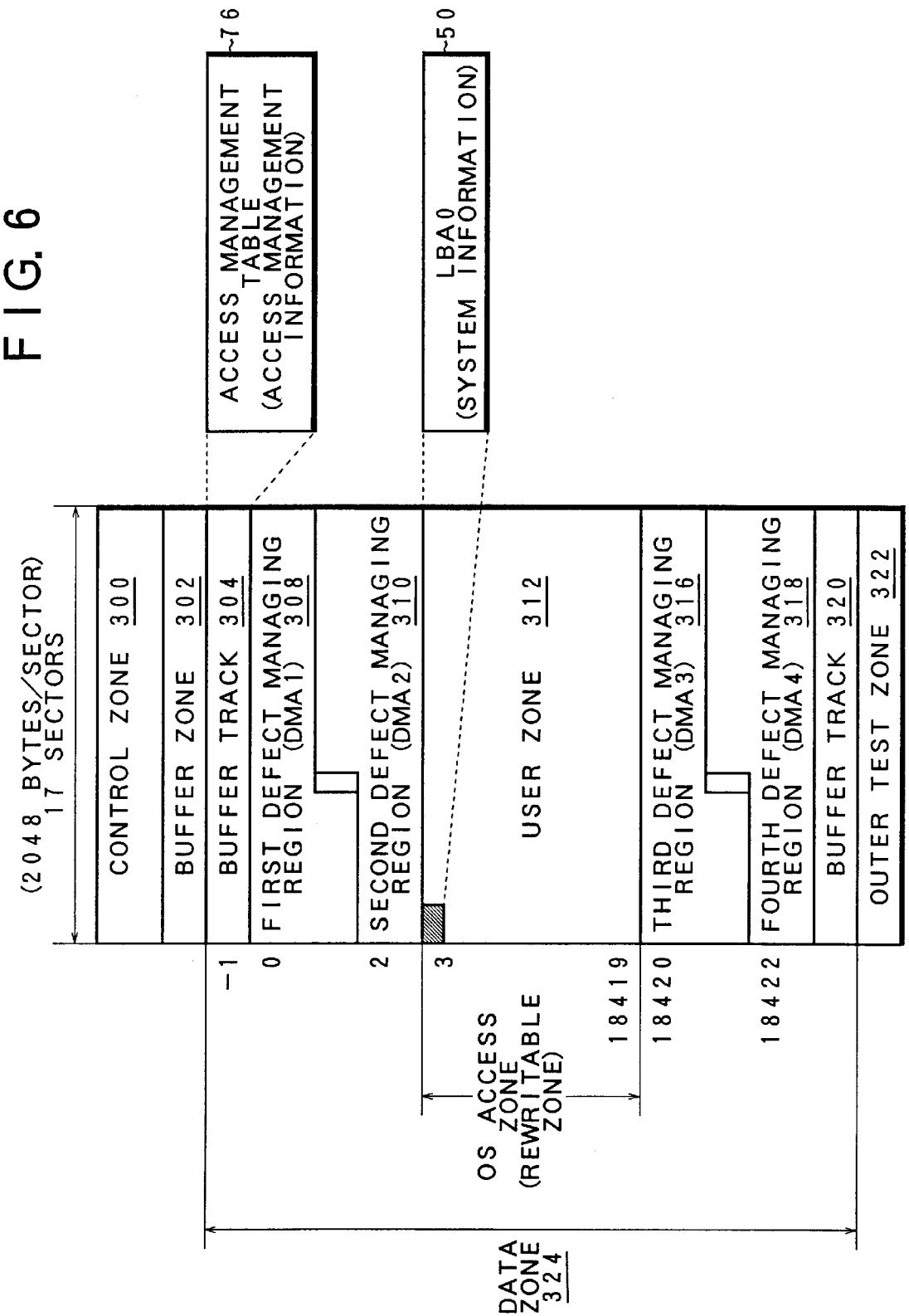
FIG. 6 is an explanatory diagram of a disk layout of an MO cartridge which is used in the invention.

FIG. 6 shows a disk layout of the MO cartridge 22 which is used in the invention and relates to the 640 MB MO cartridge as an example. In the optical disk of 640 MB, a control zone 300, a buffer zone 302, a buffer track 304, a first defect managing region (DMA1) 308, a second defect managing region (DMA2) 310, a user zone 312, a third defect managing region (DMA3) 316, a fourth defect managing region (DMA4) 318, a buffer track 320, and an outer test zone 322 are arranged from the inner side. The user zone 312 is an OS access zone (rewritable zone) which can be accessed by an SCSI interface with the upper apparatus and is divided into 11 zones from the inner side to the outer side. A region in a range from the buffer track 304 on the inner side to the buffer track 320 on the outer side is a data zone and is a range where the firmware of the optical disk drive can be accessed. The system information 50 has been recorded in a head logic block address in the user zone 312 which can be accessed from the upper apparatus.

When considering, for example, the PC/AT corresponding medium format as an MO cartridge 22, the system information 50 has been recorded in a head logic block address LBA0. On the other hand, the access management information 76 has been recorded in an area which cannot be expressed by a logic block address other than the user zone 312, for example, in the buffer track 304 on the inner side and can be accessed only from the firmware of the optical disk drive. The buffer track 320 on the outer side can be also used as an area to record the access management information 76.

Referring again to FIG. 5, the medium information reading unit 44 reads out the head logic block address LBA0 of the MO medium 272 and caches it as system information 50-1 into the buffer 118. Information regarding a partition, a format, and a boot is included in the system information 50-1 of the head logic block address LBA0. The medium information reading unit 44 also reads out the access management information 76 recorded in the area other than the user zone of the MO medium 272 and caches it as access management information 76-1 into the buffer 118. There are the following three access kinds by the MO drive 20.

I. Read access in which only the reading is permitted (ROM access)

II. Read/write access in which the reading and writing are permitted (RAM access)

III. Security access in which a password is needed.

The medium management information forming unit 46 analyzes the system information 50-1 and access management information 76-1 cached in the buffer 118 and forms medium management information 52. Now, considering the PC/AT corresponding medium format as an example, the area in the medium is divided into a plurality of data areas and is divided into partitions constructing a virtual medium. In this case, the followings have been stored in the medium management information 52.

I. Partition information (including the presence or absence of the partition)

II. Access code to decide the access kind (ROM•RAM•security)

III. Password which is used for the security access

IV. Format information showing the format

V. Bootable information showing the presence or absence of the boot program

The command processing unit 48 decodes a request command of the medium management information sent when the power source of the apparatus of the personal computer 10 is turned on, reads out the medium management information 52 formed in the buffer 118, and transfers it. In this case, partition information, bootable information, and format information which are necessary for the boot process on the upper side are sent as they are. As for the access code, for example, the access code is transferred as it is in order to allow the access kind of the partition in which an input/output request is generated from the upper side to be recognized. When the input/output request by the read or write command is received after completion of the boot process of the upper apparatus, the command processing unit 48 recognizes the partition (data area) serving as a target of the input/output request, obtains the access code set in the recognized partition from the medium management information 52 of the buffer 118, and executes the process according to the access code. That is, in case of the ROM code, only the reading operation is executed. In case of the RAM code, the reading or writing operation is executed. In case of the security code, the input/output request is executed when a collation coincidence with the password sent from the upper apparatus is obtained and, on the other hand, the input/output request from the upper apparatus is refused when the collation coincidence with the password is not derived. With respect to the case where the collation coincidence of the password is not obtained, the input/output request from the upper apparatus is refused and, at the same time, a transfer request of the password is again issued to the upper apparatus (an error can be also notified). If the collation coincidence of the password is not derived even after the above processes were executed the predetermined number of retry times, it is regarded that the access is illegal, a protecting process for deleting the data in the partition which became the access target by the password is executed. A bootup processing unit 54 which is executed at the time of turn-on of the power source by the BIOS 32, a boot processing unit 56 which is realized as a processing function of an operating system (hereinafter, referred to as an "OS") 55, and an access processing unit 60 which functions as a driver for the MO drive 20 are provided on the upper apparatus side of the personal computer 10. Further, an access management set-up processing unit 58 is provided for the OS 55. After the access processing unit 60 is activated, a registration, a change, and an erasure of the password and access code are executed for the MO drive 20 by the user operation every plural data areas defined as partitions. When the power source of the apparatus main body of the personal computer 10 is turned on, the bootup processing unit 54 of the BIOS 32 is activated, a request command of the medium management information is issued to the MO drive 20 through the MOD interface 40, and the medium management information 52 formed on the MO drive 20 side is obtained. As a request command of the medium management information which is issued by the bootup processing unit 54 of the BIOS 32, an identify command is issued in case of supporting the ATA interface as an MOD interface 40. An inquiry command is issued in case of supporting the ATAPI interface as a MOD interface 40. With respect to the other interfaces as well, a proper command defined by each interface can be also used. When the medium management information 52 is obtained from the MO drive 20, the bootup processing unit 54 of the BIOS 32 recognizes the format from the format information included in the obtained medium management information and executes the bootup process corresponding to the recognized format. The bootup processing unit 54 loads a boot program stored in the MO medium 272 into a main storage of the personal computer 10, transfers the process to the boot processing unit 56 of the OS 55, and executes the boot process. In response to the completion of the boot process, an accessible state of the MO drive 20 by the access processing unit 60 is established. At this time, when the input/output request is issued to the MO drive 20, the access processing unit 60 recognizes the access code set in the target data area, namely, in the partition with reference to the medium management information 52 which has already been obtained. When the input/output request satisfies the access kind, the read command or write command according to the access code is issued to the MO drive 20. That is, in case of the ROM code, the read command is issued. In case of the RAM code, the read command or write command is issued. Further, in case of the security code, the read command or write command is issued together with the user inputted password. On the other hand, in the case where the input/output request is out of the access kind that is decided by the access code, an error is notified to the user, thereby instructing to re-execute the input/output request.

Figure 7:
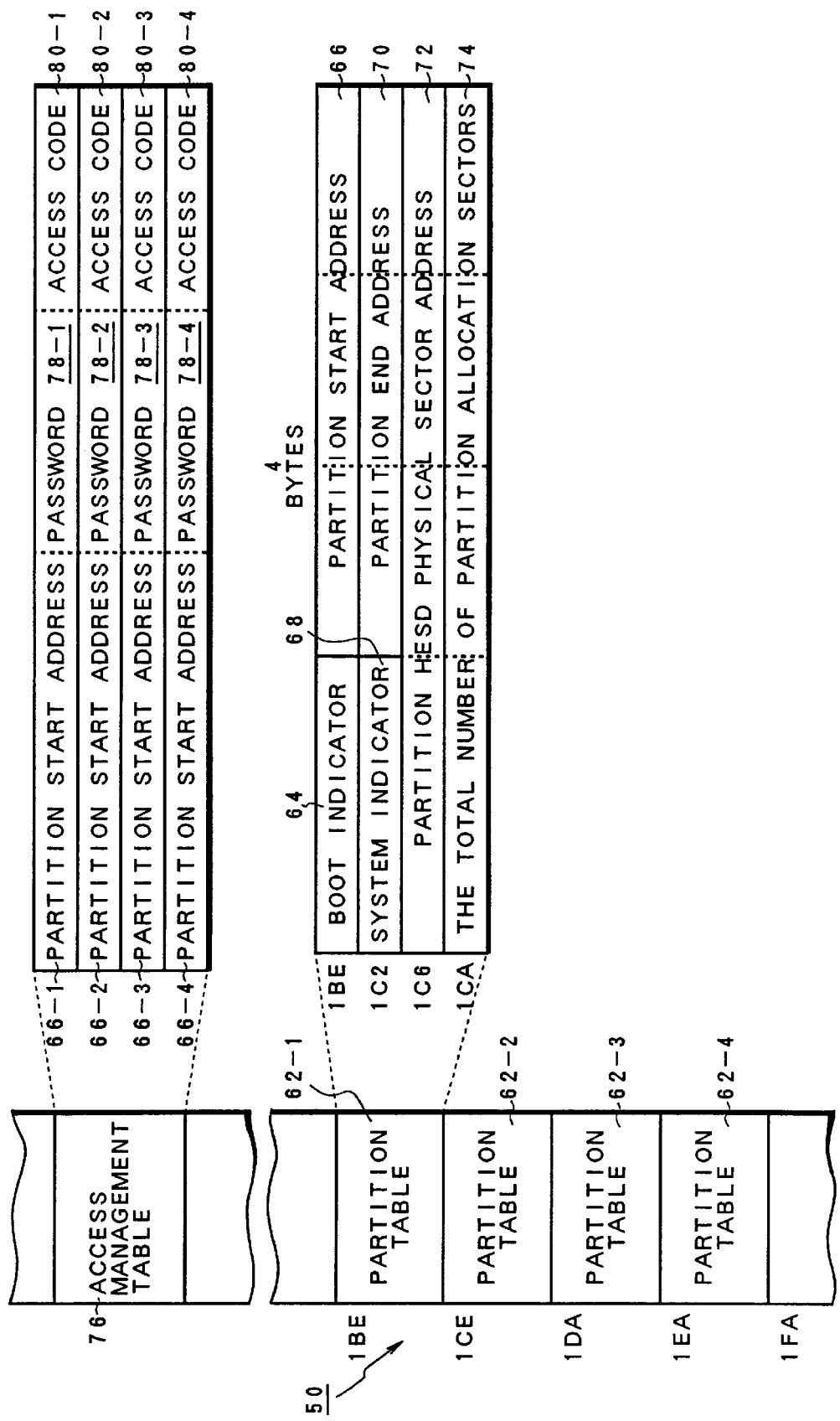
FIG. 7 is an explanatory diagram of a logic block address LBA0 read out on the drive side in FIG. 5.

FIG. 7 shows the system information 50 and access management information 76 of the MO medium 272 which are cached into the buffer 118 by the medium information reading unit 44 provided for the MO drive 20 in FIG. 5. In the PC/AT corresponding medium format, the system information 50 of LBA0 has a first partition table 62-1, a second partition table 62-2, a third partition table 62-3, and a fourth partition table 62-4. In the first to fourth partition tables 62-1 to 62-4, as representatively shown on the right side, the first partition table 62-1 is constructed by a boot indicator 64, a partition start address 66, a system indicator 68, a partition end address 70, a partition head physical sector address 72, and the total number of partition allocation sectors 74. The boot indicator 64 shows whether the boot program to boot the MO drive has been stored or not in the first partition that is designated by the partition start address 66 and partition end address 70.

As shown in FIG. 8, the boot indicator 64 indicates that a hexadecimal code "00h" of the boot indicator is a non-bootable partition and that a hexadecimal code "20h" is a bootable partition. For instance, in the case where one partition is allocated in a certain logic format, the partition certainly becomes a bootable partition. The BIOS 32 allows the bootup processing unit to read out a bootable program of the partition into the main storage, allows the bootup process of the OS to be executed, and activates an accessible state for the MO drive. On the other hand, in case of allocating a plurality of partitions to a certain logic format, the partition locating at the head and serving as a master is a bootable partition and the other remaining partitions become non-bootable partitions because the bootup process is unnecessary.

The system indicator 68 subsequently stores command numbers indicative of the formats of the partitions. FIG. 9 shows a specific example of a PC/AT corresponding format table 82. Format names 86 have been defined in the format table in correspondence to command numbers 84 using hexadecimal codes. Specifically speaking, the hexadecimal command number "00h" is an unused format name and it is possible to recognize that an unformatted partition or format is an obscure partition. The next hexadecimal command number "01h" is a format name of "DOS 12-bit FAT". As other command numbers belonging to the format names FAT, there are "DOS 16-bit<32 M" of a hexadecimal command number "04h" and "DOS 16-bit≧32 M" of a hexadecimal command number "06h". Now, "FAT" denotes a file allocation table. Although the format table 82 in FIG. 9 relates to the PC/AT corresponding OS as an example, with respect to the other OSs, it is sufficient to similarly form a format table showing command numbers and format names with regard to a format that is supported by the OS.

Referring again to FIG. 7, as representatively shown on the right side, the access management table 76 as access management information stores passwords 78-1, 78-2, 78-3, and 78-4 which have been predetermined every partition with respect to four partition start addresses 66-1, 66-2, 66-3, and 66-4 corresponding to the first to fourth partition information tables 62-1 to 62-4. Further, the access management table stores access codes 80-1, 80-2, 80-3, and 80-4 showing the access kinds in correspondence to those partitions.

FIG. 10 shows the medium management information 52 which is formed by the medium management information forming unit 46 provided in the MO drive 20 in FIG. 5 on the basis of the system information 50 and access management information 76 in FIG. 7. The medium management information 52 is constructed by partition information 88, format information 90, bootable information 92, and access management information 76. The access management information 76 includes passwords 78 and access codes 80. Since the medium management information 52 is shown with respect to the case where there are four partitions as an example, P1 to P4 are stored as partition information 88, F1 to F4 are stored as format information 90, and B1 to B4 are stored as bootable information 92. As passwords 78 of the access management information 76, for example, hexadecimal codes "AAh", "BBh", "CCh", and "DDh" are stored. As a password 78, a password which can be arbitrarily set by the user and whose number of digits is fixed can be also used. Or, a password in which the maximum length is fixedly decided and which has a variable length within a range of the maximum length can be also used. As an access code 80 of the access management information 76, in this example, two-bit codes "00", "01", "10", and "11" are sequentially stored from the first partition. The access codes have the contents shown in an access code table 98 in FIG. 11. In the access code "01", both of the read access and the write access can be performed, so that it can be regarded as an RAM code. In the access code "10", since the read access can be performed and the write access is inhibited, it can be regarded as an ROM code. Further, in the access code "11", since both of the read access and the write access are inhibited, it can be regarded as a security code. At the stage of manufacturing and shipping the MO cartridge, the access codes in the access management table 76 have been initialized to, for instance, a default of the RAM code "01" and the passwords have been also initialized to all zero or a predetermined default.

Figures 11, 12:
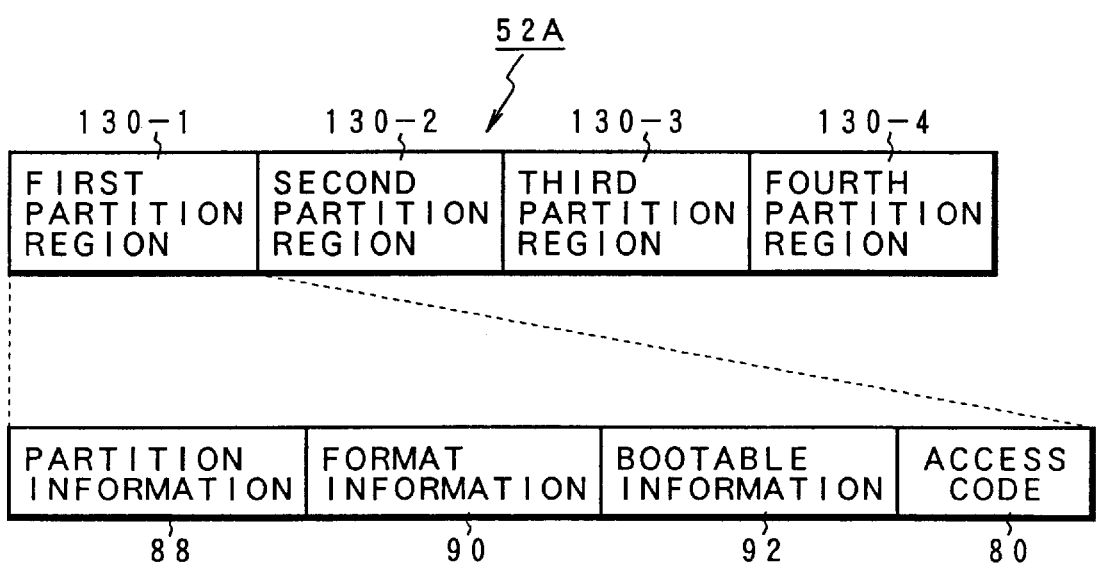
FIG. 11 is an explanatory diagram of access codes in FIG. 10.
FIG. 12 is an explanatory diagram of medium management information which is transferred from the drive in response to a command from an upper apparatus.

FIG. 12 shows medium management information 52A which is transferred in the MO drive 20 in FIG. 5 when the command processing unit 48 receives a request command of the medium management information from the bootup processing unit 54 provided for the upper BIOS 32. The medium management information 52A which is transferred to the upper apparatus is divided into first to fourth partition regions 130-1 to 130-4. As representatively shown, the first partition region 1301 is made up of the partition information 88, format information 90, bootable information 92, and access code 80. The partition information 88, format information 90, bootable information 92, and access code 80 are the same as those of the medium management information 52 in the buffer 118 in FIG. 9.

A forming process of the partition information 88, format information 90, and bootable information 92 included in the medium management information 52 in FIG. 10 by the medium management information forming unit 46 in FIG. 5 will now be described. First, as a forming method of the partition information 88, with respect to the system information 50 of LBA0 in FIG. 7, the table contents are sequentially searched in accordance with the order of the first to fourth partition tables 62-1 to 62-4, thereby discriminating whether the medium type is an HDD type having partitions or a super floppy disk type (SFD type) having no partition. When it is determined that the medium type is the HDD type having the partitions, the number of partitions is further discriminated. To verify whether the determined number of partitions is correct or not, by referring to the partition start address 66 and partition end address 70 of each partition table, it is confirmed that the number of partitions is a correct table value by discriminating from the actual medium address. As another method of discriminating the presence or absence of the partitions, it can be also discriminated by the 36th byte of the system information 50 of LBA0. When the hexadecimal code of the 36th byte of the system information 50 of LBA0 is equal to "00h", it indicates the super floppy disk type (SFD type) having no partition. When the hexadecimal code is equal to "80h", it indicates the HDD type having the partitions. As another method, the presence or absence of the partitions and the number of partitions when there are the partitions can be recognized by a proper method by the analysis of the system information 50 of LBA0. As partition information, the partition start address 66, partition end address 70, partition head physical sector address 72, and the total number of partition allocation sectors 74 in FIG. 7 can be also included as detailed information into the medium management information 52 as necessary.

FIGS. 13A to 13F show examples of command formats for registering, changing, or erasing the passwords and the access codes to/from the medium management information 52 and access management information 76 of the medium formed in the buffer 118 of the MO drive 20 by the access management set-up processing unit 58 provided for the OS 55 in FIG. 5. As commands which are used in the access management set-up processing unit 58, as shown in FIGS. 13A to 13F, there are six kinds of commands comprising a password registration command 100, an access code registration command 105, a password change command 112, an access code change command 116, a password erasing command 120, and an access code erasing command 124. In the password registration command 100 in FIG. 13A, subsequent to a command code 102 showing the password registration, a partition address 104 is provided and a user set password 106 is finally provided. The access code registration command 105 in FIG. 13B has a command code 108 showing the access code registration, the partition address 104, and password 106 and a user set access code 110 to be registered is provided after the password 106. The access code registration by the access code registration command 105 is executed after the password 106 was registered by using the password registration command 100 in FIG. 13A. The access code 100 can be registered under a condition of the collation coincidence between the password which has already been registered and the password 106. In the password change command 112 in FIG. 13C, subsequent to a password change command code 114 and the partition address 104, an old password 106-1 before a change and a new password 106-2 after the change are provided. Therefore, if the coincidence collation of the old password 106-1 before the change is not obtained, it cannot be changed to the new password 106-2. The access code change command 116 is constructed by a command code 121, the partition address 104, the password 106, and the access code 110 after the change and is fundamentally the same as the access code registration command 105 in FIG. 13B. The password erasing command 120 in FIG. 13E is constructed by a command code 122 indicative of the password erasure, the partition address 104, and the password 106. The access code erasing command 124 in FIG. 13F is constructed by a command code 126 showing the access code erasure, the partition address 104, and the password 106. By this command, the corresponding access code is erased under the condition of the coincidence collation of the password 106.

FIGS. 14A and 14B are flowcharts for the processing operation on the MO drive 20 side when the power source of the apparatus is turned on in the functional block diagram of FIG. 5. When the power source of the apparatus is turned on by turning on the power source of the apparatus of the personal computer 10, namely, by operating a power switch provided for the personal computer main body 12, the MO drive 20 in FIG. 5 allows the medium information reading unit 44 to read out the system information 50 and access management information 76 of LBA0 in FIG. 7 recorded on the MO medium 272 in the MO cartridge 22 inserted to the drive and caches them as system information 50-1 and access management information 76-1 into the buffer 118. Subsequently, in step S2, the system information 50-1 and access management information 76-1 cached in the buffer 118 are analyzed. As shown in FIG. 10, the partition information 88, format information 90, bootable information 92, and access management information 76 including the passwords 78 and access codes 80 are formed every partition. In step S3, a check is made to see if the request command of the medium management information has been received in association with that the bootup process was executed by the bootup processing unit of the BIOS 32 installed on a mother board of the personal computer 10 activated by the turn-on of the power source. When the request command of the medium management information is received from the upper apparatus, step S4 follows. On the basis of the medium management information 52 in the buffer 118, the medium management information 52A for transfer as shown in FIG. 12 is formed and transferred to the BIOS 32 on the upper apparatus side. Thus, the boot process on the upper apparatus side is executed and an accessible state of an input/output request for the MO drive 20 is established. In step S5, a check is made to see if the read command or write command due to the input/output request from the upper apparatus has been received. When the command is received, an input/output process is executed in step S6. In the input/output process, as will be obviously explained hereinlater, the input/output process according to the access kind designated by the access code is executed. In step S7, when it is determined that the access management commands as shown in FIGS. 13A to 13F which are issued by the access management set-up processing unit 58 provided for the OS 55 in FIG. 5 have been received, an access managing process for registration, change, and erasure of the password and/or the access code is executed in step S8. In this case, the registration, change, and erasure of the access code are executed for both of the medium management information 52 in the buffer 118 and the access management information 76 in the medium. Further in step S9, when there is a medium ejecting instruction of the MO cartridge, a medium ejecting process is executed in step S10. In the medium ejecting process, the medium management information 52 formed in the buffer 118 in FIG. 4 is cleared so as not to be left on the drive. When there is an end instruction based on the log-off by the operation to turn off the apparatus power source in step S11, an end process is executed in step S12. The registration, change, erasure, and the like of the access management information 76 of the medium can be also updated prior to the medium ejection or the turn-off of the power source.

FIG. 15 is a flowchart showing the details of the input/output process in step S6 in FIG. 14B. In the access processing unit 60 provided for the OS 55 in FIG. 5, when the input/output request is issued to the MO drive 20, the read command or write command is generated. When the input/output request by the read command or write command accompanied with the password from the upper apparatus is received, in step S1, the corresponding partition is recognized from the access address and the access code is recognized with reference to the medium management information 52 in the buffer in FIG. 10. When it is recognized in step S2 that the access code is the security code, the password received from the upper apparatus is collated with the password read out from the medium management information in step S3. In step S4, when the collation coincidence of the password is obtained, step S5 follows. The security is cancelled and the reading operation or writing operation is executed. With respect to the password collation in step S3, when the collation coincidence is not obtained in step S4, step S5 follows and a count value of a counter N is increased. In step S6, a check is made to see if the number N of times of collation dissidence has reached a predetermined value, for example, 3 times. If it is less than 3, a re-transmission of the password is requested to the upper apparatus in step S7. An error can be also notified in place of the re-transmission request. If the collation dissidence is repeated in response to the request to re-transfer the password as mentioned above and the number N of times of dissidence reaches 3 times in step S6, the processing routine advances to step S8 and the data of the partition serving as an access target is deleted. That is, when the dissidence result is obtained three times even if the re-transfer of the password is requested, this means that the access is illegal. Therefore, to protect the security of the data, the data of the partition serving as an access target is deleted. When the access code is not the security code in step S2, step S9 follows and a check is made to see if it is the ROM code. In case of the ROM code, the reading process is executed in step S10. In this case, if an upper command is the write command, an error is notified. Further, when the access code is not the ROM code in step S9, step S11 follows and a check is made to see if it is the RAM code. In case of the RAM code, the reading or writing process is executed in step S12.

Figure 16:
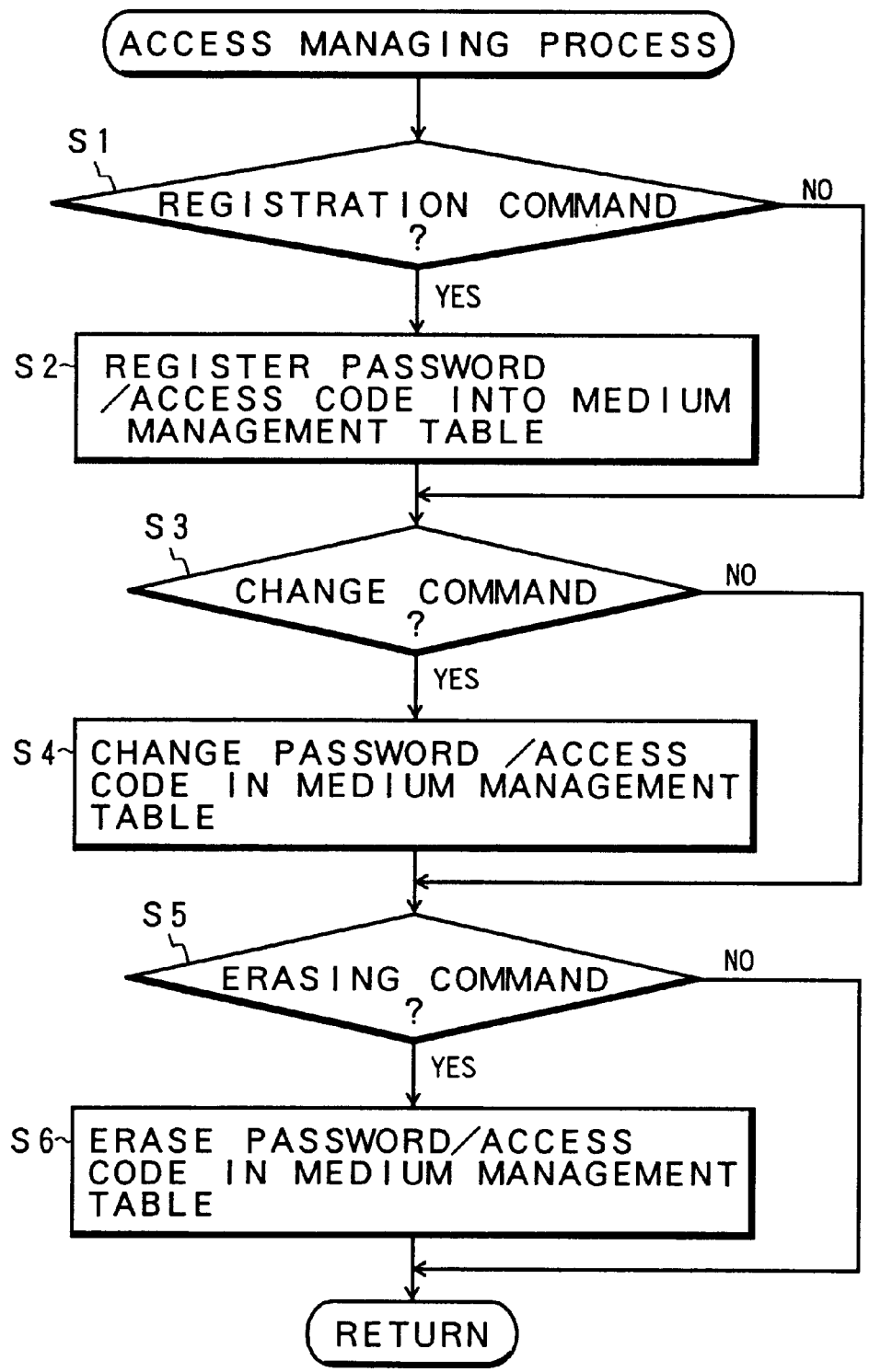
FIG. 16 is a flowchart for an access managing process on the drive side in FIGS. 14A and 14B.

FIG. 16 is a flowchart showing the details of the access managing process in step S8 in FIG. 14B. In the access managing process, when the received access management command is the password registration command 100 or access code registration command 105 in FIGS. 13A or 13B in step S1, step S2 follows. The password or access code instructed by the command is registered into the medium management information 52. At the same time, the password or access code instructed by the command is also registered in the access management information 76 on the medium. In step S3, when the password change command 112 or access code change command 116 in FIG. 13C or 13D is determined, the password or access code in the medium management information 52 is changed in step S4. At the same time, the password or access code in the access management information 76 on the medium is also changed. Further, in step S5, when the password erasing command 120 or access code erasing command 124 in FIG. 13E or 13F is determined, the password or access code in the medium management information 52 is erased in step S6. At the same time, the password or access code in the access management information 76 on the medium is also erased. The change/erasure of the password cannot be performed so long as the collation coincidence of the registered password is not obtained. Therefore, any person who does not know the registered password cannot perform the erasure/change.

Figure 17:
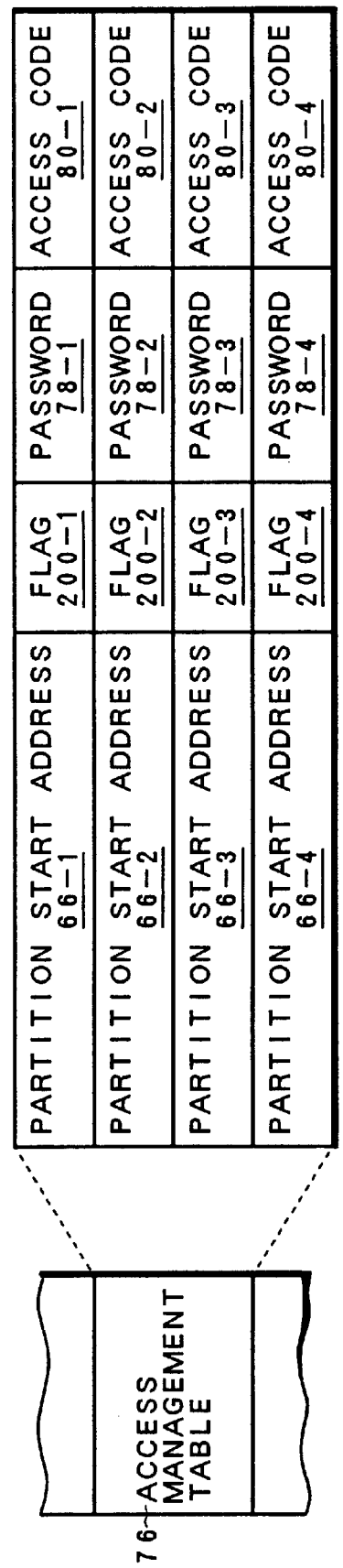
FIG. 17 is an explanatory diagram of another embodiment of access management information on a medium having flags.

FIG. 17 shows another embodiment of the access management information (access management table) 76 of the MO medium 272 which is cached into the buffer 118 by the medium information reading unit 44 in FIG. 5. The embodiment is characterized in that each of flags 200-1 to 200-4 is provided every partition. In the case where the security code has been set as access codes 80-1 to 80-4, the flags 200-1 to 200-4 set the following modes. For example, I. A password indispensable mode is set by flag 0.

II. An initial password mode is set by flag 1.

The password indispensable mode is a mode in which the collation coincidence of the password is needed every time the security code is recognized in step S2 in FIG. 15. On the other hand, the initial password mode is a mode in which although the collation coincidence of the password is necessary in the first access when the drive medium is inserted, the access is enabled even if there is no password at the second and subsequent times. With this method, troublesomeness such that the password is needed every time can be eliminated. In case of changing the flags 200-1 to 200-4 in the access management table 76 on the medium, the collation coincidence of the password is certainly needed in a manner similar to the case of the access codes 80-1 to 80-4.

FIGS. 18A and 18B are flowcharts for the processing operation at the time of the turn-on of the apparatus power source of the BIOS and OS serving as an upper apparatus side in FIG. 5. When the apparatus power source is turned on, first in step S1, the BIOS 32 activates the bootup processing unit 54 and generates the request command of the medium management information to the MO drive 20, thereby obtaining the medium management information. In step S2, the BIOS 32 understands the obtained medium management information. That is, the BIOS recognizes the partition information, format information, boot information, and access code included in the medium management information. In step S3, a check is made to see whether the head partition (master partition) in which the bootup program has been stored is a bootable partition or not from the bootable information included in the medium management information. If it is the bootable partition, step S4 follows and the bootup program which has preliminarily fixedly been recorded in the BIOS 32 serving as a head portion of the boot program corresponding to the format derived from the format information is executed. The boot program stored in the bootable partition of the MO medium 272 is read out by the execution of the bootup program and is loaded into the main storage. The process is shifted from the bootup processing unit 54 to the boot processing unit 56 of the OS 55 and the boot process is executed. By the completion of the boot process, the access processing unit 60 of the OS 55 establishes an accessible state for the MO drive 20. In step S3, when it is determined from the medium management information that the head partition is a non-bootable partition, since the bootup cannot be performed, an error process is performed in step S14. When the access processing unit 60 establishes the accessible state by the normal end of the boot process, an access management set-up process is executed as necessary in step S5. For example, if the cartridge of the MO drive 20 is a medium in which none of the password and access code is registered yet, this means that the access management information obtained in step S2 is in a reset state with respect to all of the partitions. Therefore, the user executes the changing process of the password or access code by using a medium management set-up picture plane 132 as shown in FIG. 19.

Figure 19:
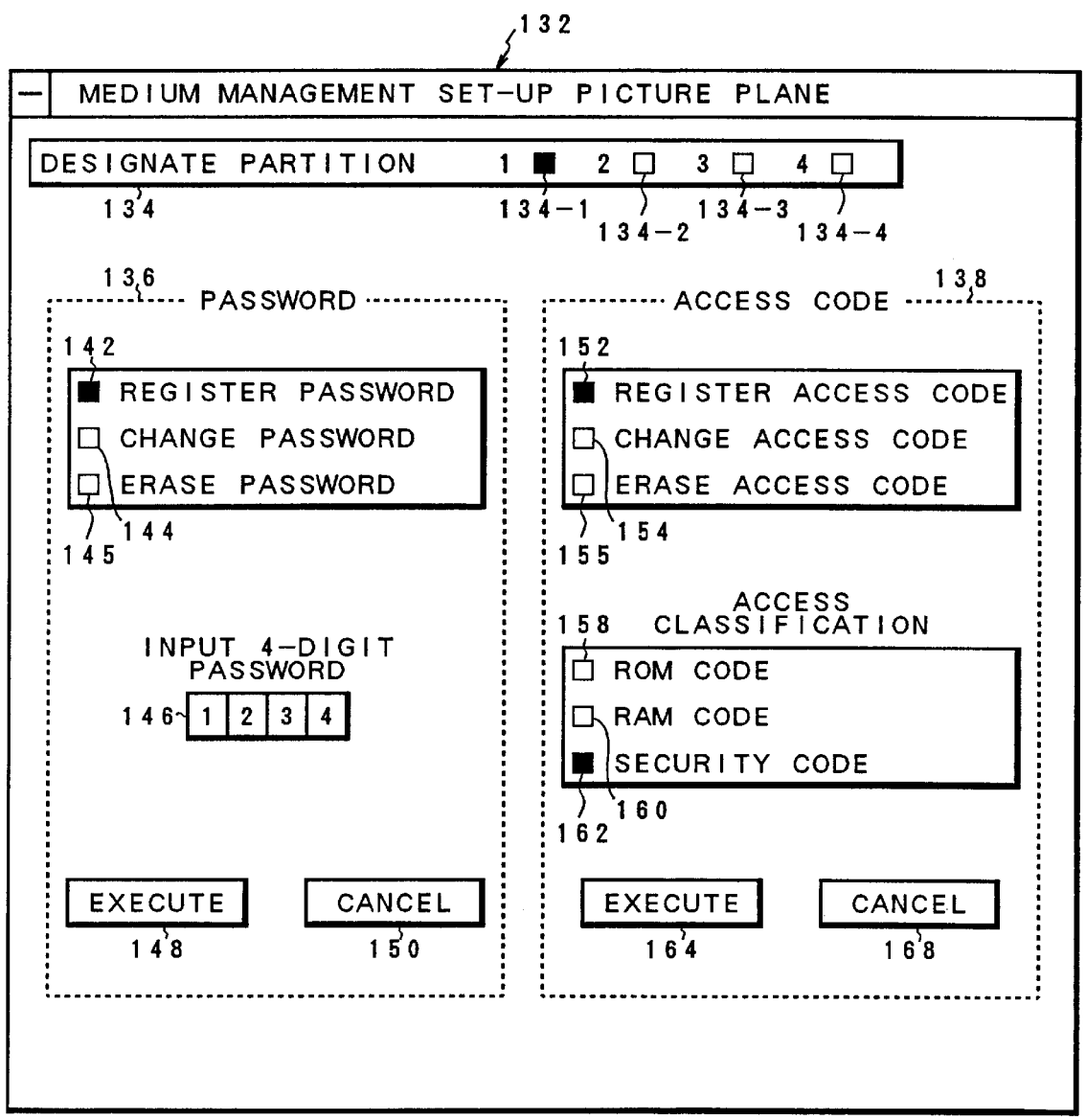
FIG. 19 is an explanatory diagram of a registering operation of a medium management set-up picture plane which is used in an upper apparatus in FIGS. 18A and 18B.

The medium management set-up picture plane 132 in FIG. 19 has a partition designating unit 134, a password setting unit 136, and an access code setting unit 138. For example, check boxes 134-1 to 134-4 corresponding to four partitions are provided for the partition designating unit 134. The check box of the partition serving as a set-up target is selected by a mouse click. In this case, the check box 134-1 of the partition 1 is selected by the mouse click. Three check boxes 142, 144, and 145 corresponding to the password registration, password change, and password erasure are provided for the password setting unit 136. Under those boxes, a password input frame 146 is provided and an execute key 148 and a cancel key 150 are further provided. In this case, the check box 142 is mouse clicked and the password registration is selected. For example, a password "1234" is inputted to the password input frame 146. By operating the execute key 148 in this state, the password can be set and registered to the MO drive side. Three check boxes 152, 154, and 155 of the access code registration, access code change, and access code erasure are provided for the access code setting unit 138. Under those boxes, check boxes 158, 160, and 162 of the ROM code, RAM code, and security code are provided as access kinds. In this picture plane, the check box 152 of the access code registration is selected by the mouse click and the check box 162 of the security code is selected as an access kind.

FIG. 20 shows the medium management set-up picture plane 132 which is used for the changing operation after the password and access code were once registered. In this case, the check box 144 of the password change of the password setting unit 136 is selected. By selecting the password change, a password input frame 146-1 to input the old password before a change and a password input frame 146-2 to input a new password after the change are provided under the check box 144.

FIG. 21 shows the medium management set-up picture plane 132 in case of erasing the password or access code which was registered or changed. In this case, the check box 145 of the password erasure is selected and the password to be erased is inputted to the password input frame 146. The check box 145 of the access code erasure is selected and a check box 156 of the normal code is selected as an access kind.

The access management set-up process in step S5 in FIGS. 18A and 18B can be executed by opening the medium management set-up picture plane 132 as shown in FIGS. 19, 20, and 21 not only when the apparatus is activated but also at an arbitrary timing during the operation in steps S6 to S13.

Figure 22:
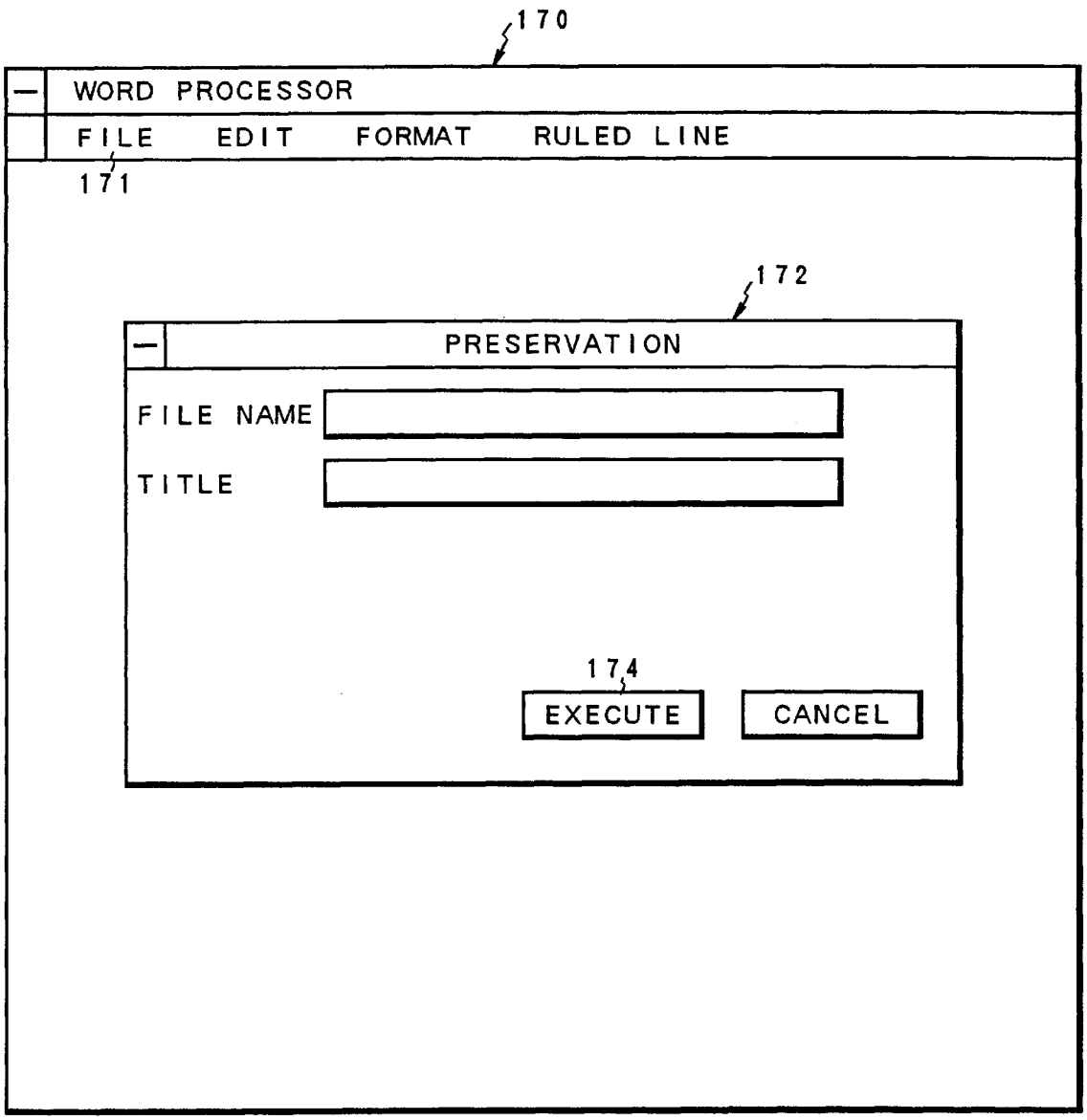
FIG. 22 is an explanatory diagram of a preserving picture plane for storing a file into a storing apparatus by the upper apparatus in FIGS. 18A and 18B.
Figure 23:
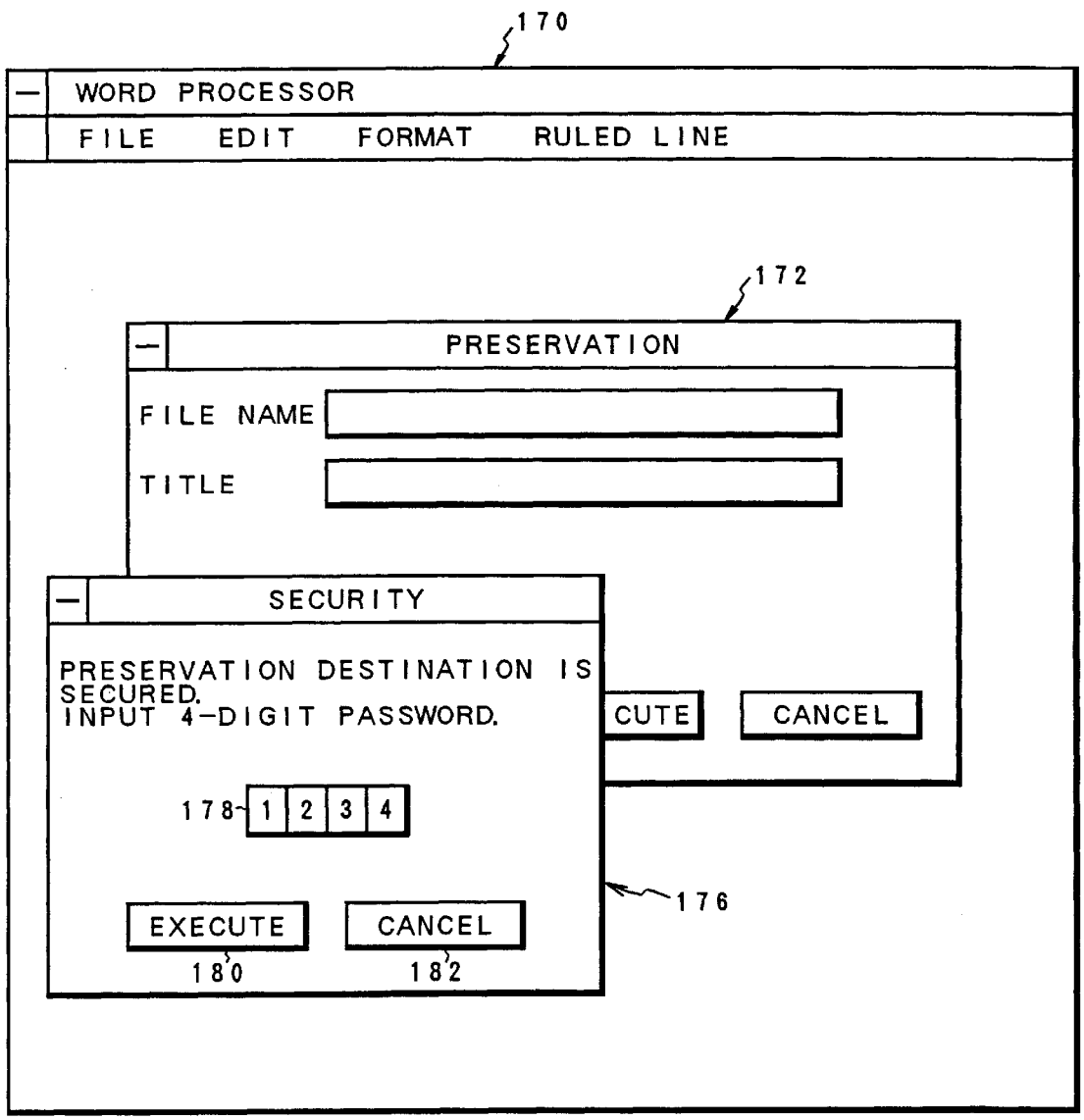
FIG. 23 is an explanatory diagram of a password request window displayed on the basis of medium management information of the drive at the time of the preservation execution in FIG. 22.

Referring again to FIGS. 18A and 18B, subsequently to the access management set-up process in step S5, a check is made in step S6 to see if the input/output request for the MO drive 20 has been generated. For example, when the user finishes a making and an edition of a file on the picture plane and executes a preserving process to preserve the formed file into the MO drive, the occurrence of the input/output process in association with it is discriminated in step S6. The read command or write command is issued to the MO drive 20 in step S7. When the read command or write command of the input/output request is generated, if the security code is determined from the obtained access management information in step S9, the presence of the password request is decided and a message to promote the input of the password is displayed to the user. A command in association with the password input is transferred in step S9. For example, when the making and edition of a document is finished by a word processor by using an editor picture plane 170 in FIG. 22 and a file key 171 in the upper column is opened and a file preservation is selected from this picture plane, a preservation window 172 is opened. After a file name and a title were inputted with respect to the preservation window 172, when the security code is recognized with reference to the medium management information by operating an execute key 174, a password request window 176 is opened as shown in FIG. 23. The contents such that the security has been set to the preservation destination and a password is necessary are shown in the password request window 176. Therefore, when the user inputs, for example, the password "1234" into a password input frame 178 and operates an execute key 180, a write command for preservation accompanied with the password is issued. In the case where the ROM code or RAM code is recognized from the medium management information, on the other hand, the read command or write command is issued as it is without needing any password. Referring again to FIGS. 18A and 18B, for the command transfer, the apparatus waits for a notification indicative of the normal end from the MO drive 20. When the normal end is detected in step S10, step S12 follows and another process is executed. The processes from step S6 are repeated until there is an end instruction in step S13. When the processing routine is not normally finished in step S10 by the generation of the input/output command to the MO drive, the corresponding error process is executed in step S11.

[Drive Plug-in Type]

Figure 24:
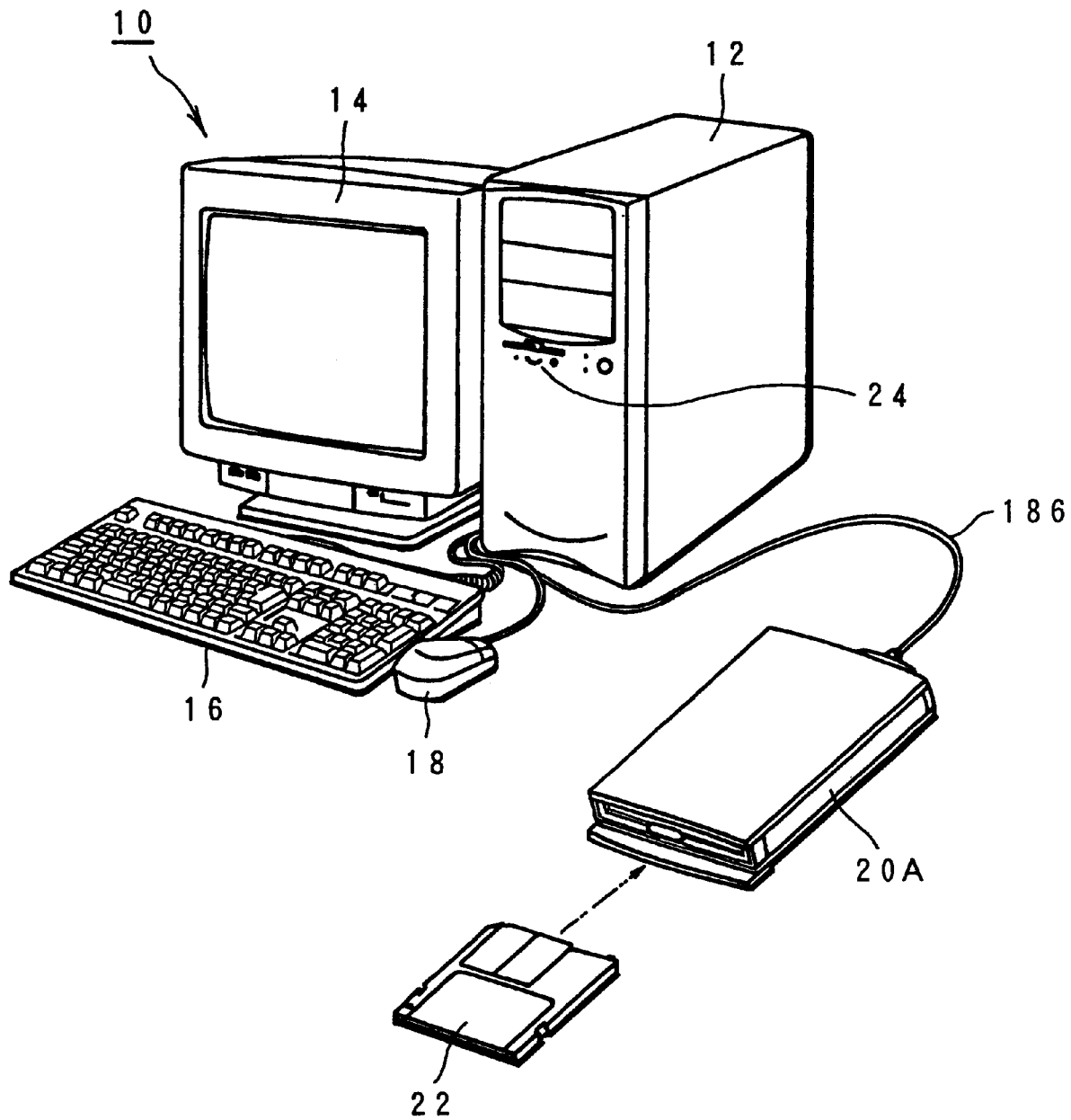
FIG. 24 is an explanatory diagram of a system construction using a plug-in type drive.

FIG. 24 shows another embodiment of a personal computer to which a storing system using a removable medium according to the invention is applied. The embodiment is characterized in that the apparatus is constructed as a plug-in type in which the MO drive 20 is externally connected to the personal computer by a connector cable and is used. The personal computer 10 is constructed by the personal computer main body 12, display 14, keyboard 16, and mouse 18. An externally attached MO drive 20A is of the plug-in type in which it is connected to the personal computer main body 12 by a connector cable 186. In the plug-in type MO drive 20A, a power switch provided for the MO drive 20A is turned on in an operating state where the apparatus power source of the personal computer 10 is turned on and the MO cartridge 22 is inserted, thereby allowing the access by the personal computer 10 to be executed. Therefore, in case of the plug-in type MO drive 20A, the boot process at the time of turn-on of the apparatus power source as that in the personal computer built-in type of FIG. 1 is unnecessary. By a connection notification to the personal computer 10 when the power source of the MO drive 20A is turned on and the MO cartridge 22 is inserted, an accessible state of the MO drive 20A by the OS on the personal computer 10 side is established.

Figure 25:
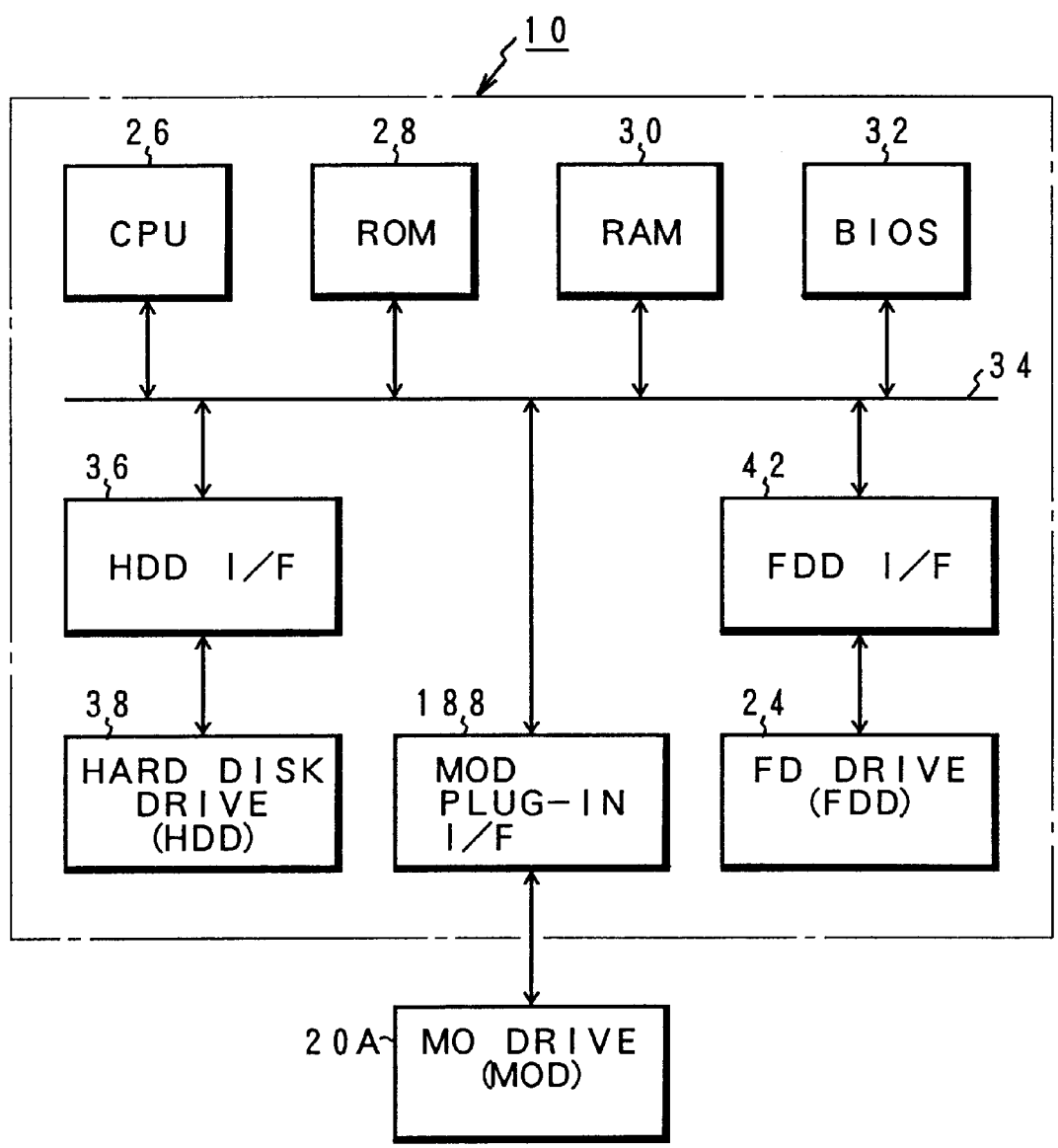
FIG. 25 is a block diagram of a hardware construction in FIG. 24.

FIG. 25 is a block diagram of the hardware construction of FIG. 24. The personal computer 10 comprises the CPU 26, ROM 28, RAM 30, BIOS 32, bus 34, hard disk drive 38 connected through the HDD interface 36, and FD drive 24 connected through the FDD interface 42 in a manner similar to the built-in type of FIG. 2. Further, in the embodiment, the MO drive 20A is externally connected to an MOD plug-in interface 188 by a connector cable. Besides an ordinary interface cable, a construction such that a PC card is connected into a card slot of the personal computer 10 can be also used as an MOD plug-in interface 188.

Figure 26:
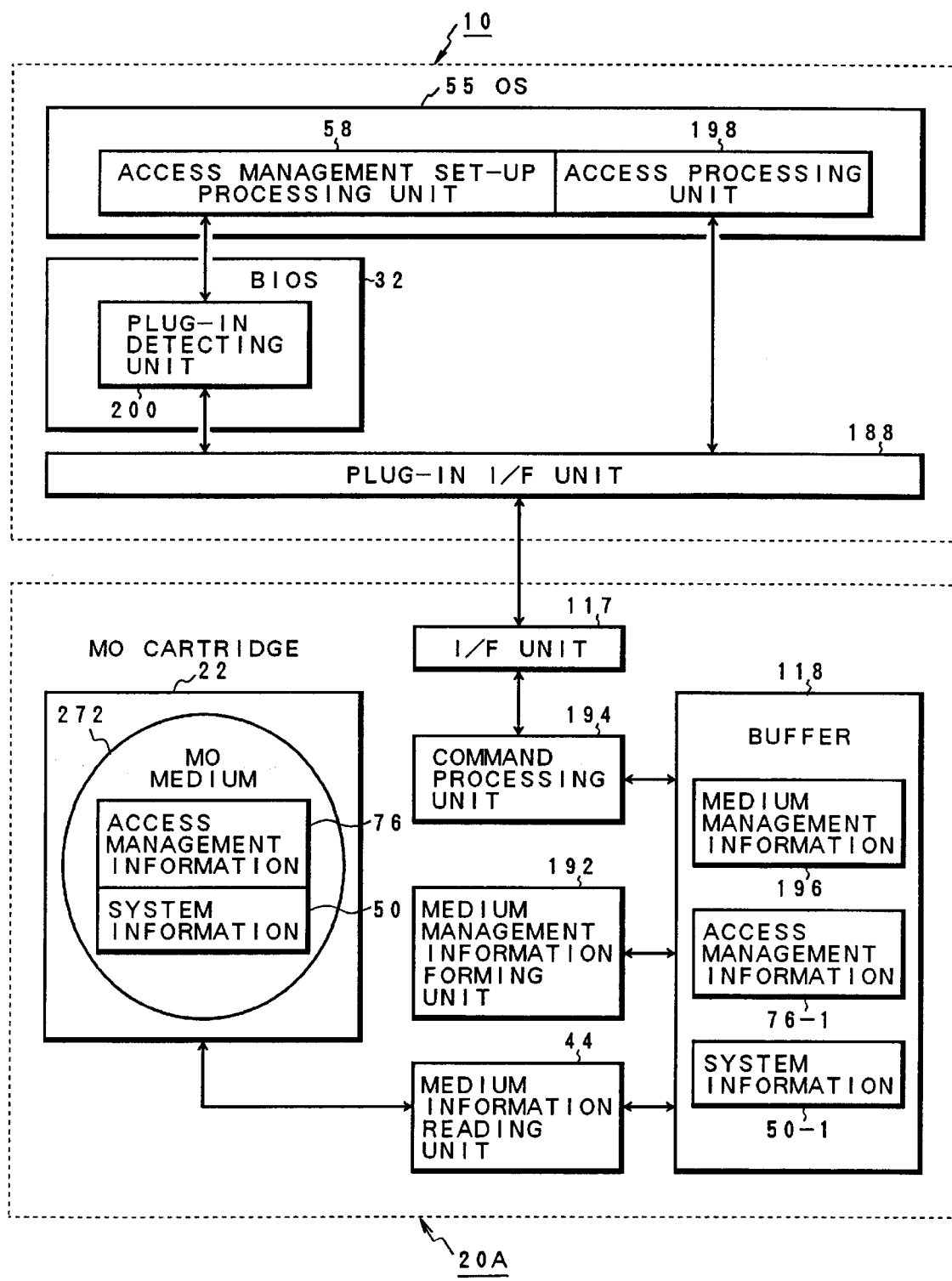
FIG. 26 is a functional block diagram of FIG. 20 using the plug-in type drive.
Figures 27, 28:
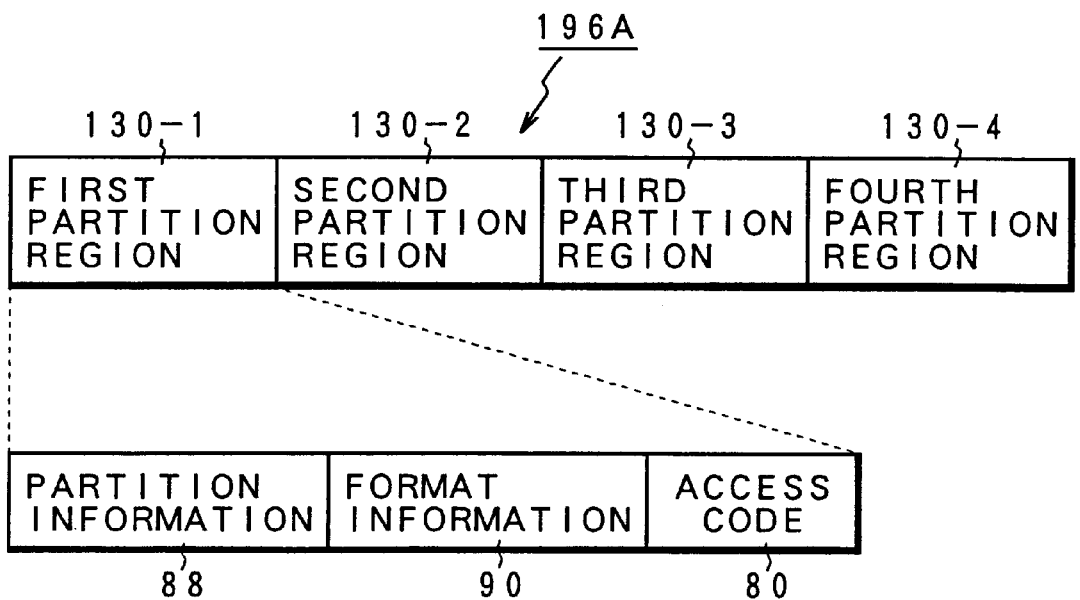
FIG. 27 is an explanatory diagram of medium management information which is formed on the drive side i n FIG. 26.
FIG. 28 is an explanatory diagram of medium management information which is transferred from the drive in response to a command from the upper apparatus.

FIG. 26 is a functional block diagram of a storing system of the invention for the plug-in type MO drive in FIG. 25 as a target. The MO drive 20A comprises the medium information reading unit 44, a medium management information forming unit 192, and a command processing unit 194. In an operating state where the apparatus power source on the personal computer 10 side is turned on, when a power source of the MO drive 20A is turned on and the MO cartridge 22 is inserted, the medium information reading unit 44 operates, reads out the system information 50 and access management information 76 from the MO medium 272, and caches them as system information 50-1 and access management information 76-1 into the buffer 118. The system information 50 and access management information 76 are the same as those in FIG. 7. The medium management information forming unit 192 analyzes the system information 50-1 and access management information 76-1 cached in the buffer 118 and forms medium management information 196. As shown in FIG. 27, for example, the partition information 88, format information 90, and further, passwords 78 and access codes 80 as access management information 76 are registered in the medium management information 196 in correspondence to four partitions. That is, the medium management information 196 is substantially the same as that of medium management information 52 in FIG. 9 except that the bootable information 92 is removed therefrom. When the request command of the medium management information from the personal computer 10 in association with the insertion of the MO cartridge 22 is received, the command processing unit 194 forms medium management information 196A for transfer as shown in FIG. 28 on the basis of the medium management information 196 formed in the buffer 118 and transfers it. The medium management information 196A is obtained by removing the bootable information 92 from the medium management information 52A in FIG. 12. On the other hand, on the personal computer 10 side, since it has already been in the operative mode by the turn-on of the apparatus power source, by the bootup process of the BIOS 32 at the time of turn-on of the apparatus power source, an access processing unit 198 of the OS 55 establishes the accessible state for the input/output apparatus including the external MO drive 20A, for instance, by the boot process by loading the boot program stored in the hard disk drive 38 in FIG. 25. In case of the plug-in type MO drive 20A, therefore, the bootup process by the BIOS 32 and the boot process by the OS 55 are unnecessary. In place of them, a plug-in detecting unit 200 is provided for the BIOS 32. The detecting unit 200 detects the insertion of the MO cartridge 22 after the turn-on of the power source of the MO drive 20A which is externally connected through the plug-in interface unit 188 and notifies the access processing unit 198 of the OS 55 of a fact that the MO drive 20A has been connected (ready). When the connection notification (ready) of the MO drive 20A is received by the plug-in detecting unit 200 of the BIOS 32, the access processing unit 198 of the OS 55 generates a request command to obtain the medium management information 196. The request command of the medium management information which is issued by the access processing unit 198 is an identify command in the case where the MO drive 20A supports the ATA interface. In the case where the MO drive supports the ATAPI interface, an inquiry command is used. When the medium management information 196 is obtained from the MO drive 20A by the request command of the medium management information, the access processing unit 198 recognizes the presence or absence of the partitions from the partition information 88 included in the medium management information 196, namely, the number of partitions if there are the partitions. The access processing unit also recognizes the format as shown in FIG. 9 from the command number in the format information 90 and establishes an accessible state of the MO drive 20A for each partition by the recognized logic format. Further, when the input/output request for the MO drive 20A is generated, the access processing unit 198 recognizes the access code 80 in the access management information 76 included in the medium management information 196 obtained from the MO drive 20A. When the access code is the security code, the access processing unit requests the user to set the password by the password request window 176 as shown in FIG. 23 and generates the read command or write command accompanied with the password. When the ROM code or RAM code is recognized, no password is necessary. The access management set-up processing unit 58 provided for the OS 55 performs the registration, change, and erasure of the password and/or access code of the medium management information 196 formed in the buffer 118 of the MO drive 20A and the access management information 76 on the medium by using the medium management set-up picture plane 132 as shown in FIGS. 19 to 21 as necessary.

Figure 29B:
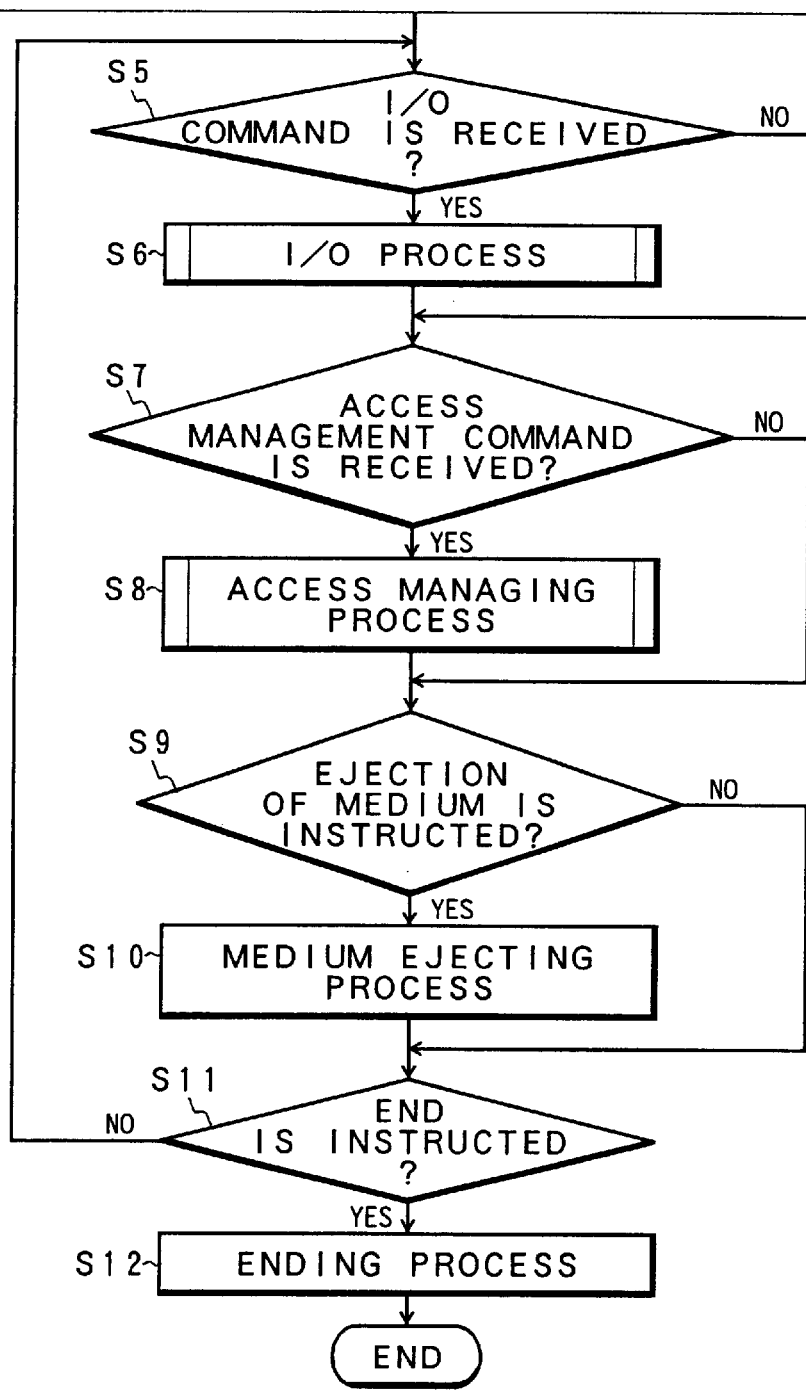

FIGS. 29A and 29B are flowcharts for the processing operation in the case where the power source of the plug-in type MO drive 20A in FIG. 26 is turned on and the medium is inserted. When the power source of the MO drive 20A is turned on and the MO cartridge 22 is inserted, in step S1, the system information 50 and access management information 76 recorded on the medium are read out and cached as system information 50-1 and access management information 76-1 into the buffer 118. Subsequently, in step S2, the system information 50-1 and access management information 76-1 cached in the buffer 118 are analyzed and, as shown in FIG. 27, the partition information 88, format information 90, and access management information 76 including the password 78 and access code 80 are formed and stored as medium management information 196 into the buffer 118. In step S3, a check is made to see if the request command of the medium management information has been received from the upper OS 55. When the command is received, in step S4, the medium management information 196A for transfer as shown in FIG. 28 is formed from the medium management information 196 and is transferred to the upper apparatus. Thus, the accessible state is established for the MO drive 20A on the upper apparatus side and, after that, the input/output request is issued as necessary. That is, although processes as shown in steps S5 to S12 are executed, these processes are the same as those in steps S5 to S12 in FIGS. 14A to 14B. Among them, the input/output process in step S6 is the same as that of the detailed flowchart of FIG. 15. The access managing process in step S8 is the same as that of the detailed flowchart of FIG. 16.

Figure 30A:
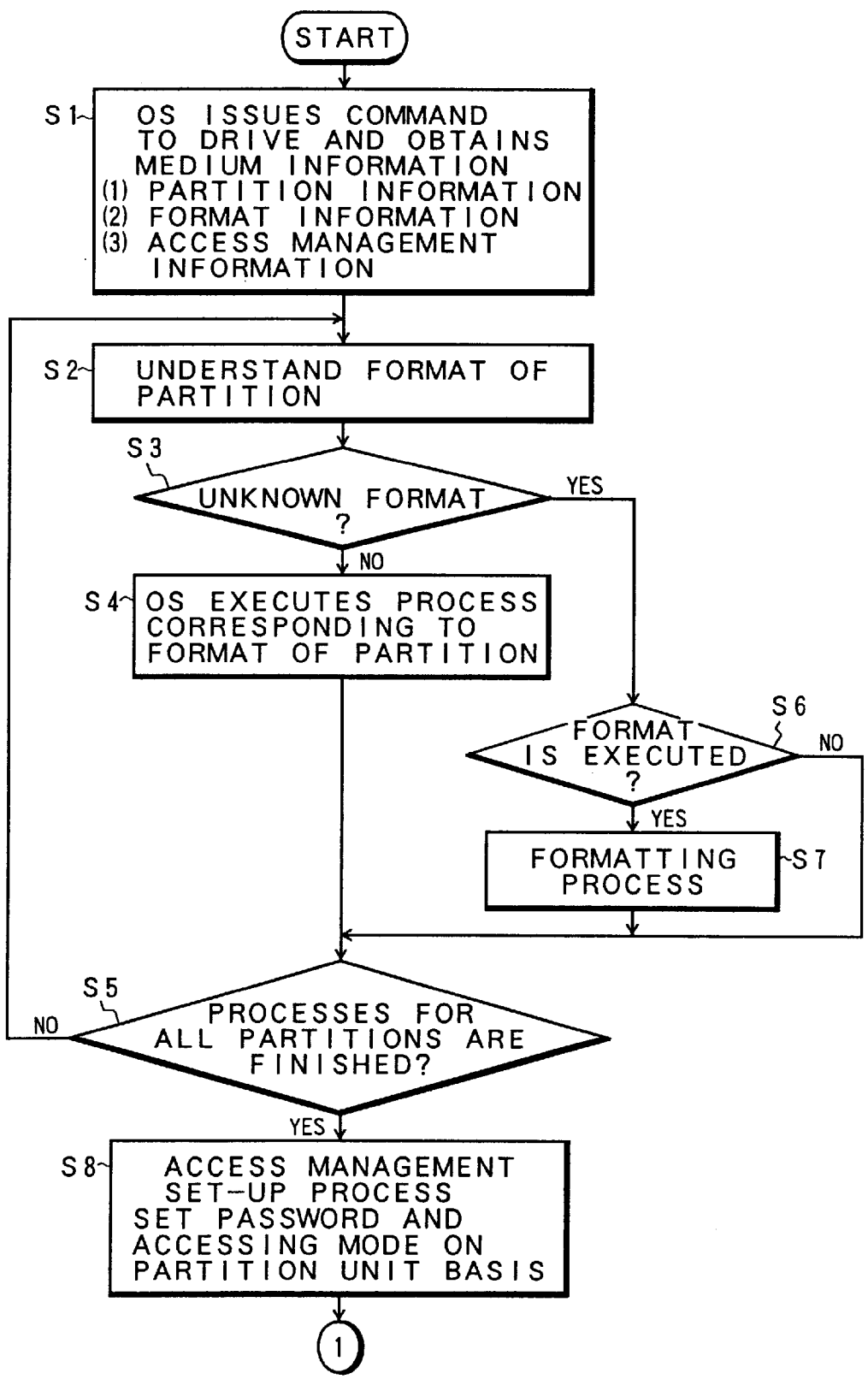
FIGS. 30A and 30B are flowchart s for a processing operation of an upper OS in FIG. 24.
Figure 30B:
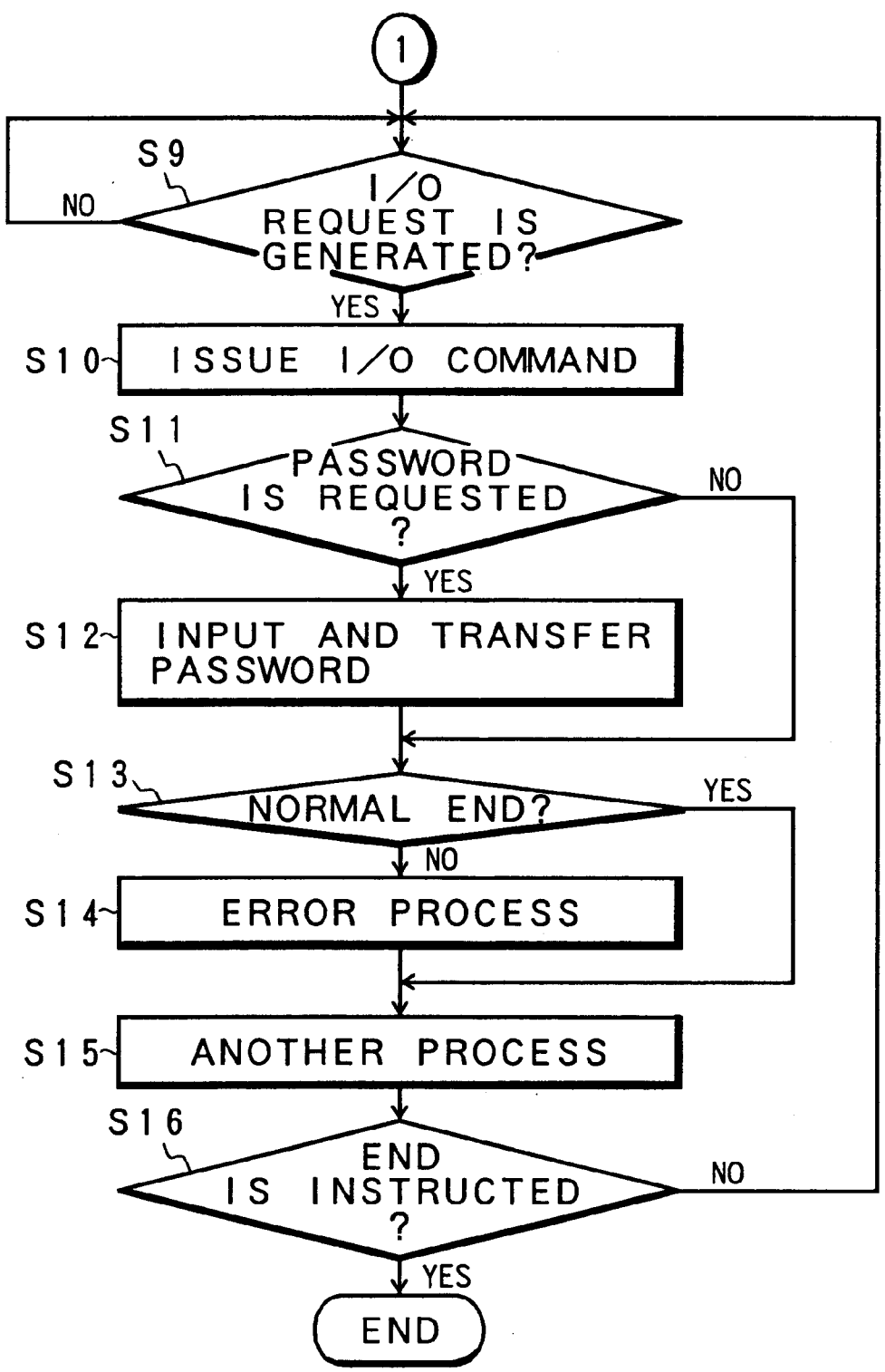

FIGS. 30A and 30B are flowcharts for the processing operation on the personal computer 10 side using the plug-in type MO drive 20A in FIG. 26. When a drive connection based on the insertion of the MO cartridge 22 after the turn-on of the power source of the MO drive 20A which is used by plug-in is detected, the plug-in detecting unit 200 of the BIOS 32 provided on the personal computer 10 side notifies the access processing unit 198 of the OS 55 of a fact that the drive has been connected. Processes in FIG. 30A are started. First in step S1, the OS 55 issues the request command of the medium management information to the MO drive 20A and obtains the medium management information. Subsequently, in step S2, the format of the partition is understood. If it is not the obscure format in step S3, the processing routine advances to step S4. The OS 55 executes an activating process for setting the MO drive 20A into the accessible state corresponding to the format of the partition. In step S5, a check is made to see if the processes of the OS have been finished with respect to all partitions. If the processes are not finished yet, the processing routine is returned to step S2 and similar processes are repeated with regard to the residual partitions. On the other hand, if the format is obscure or is not formatted in step S3 with regard to a specific partition, step S6 follows and a check is made to see if the formatting is performed. When a formatting process has been instructed by a set-up menu, the instructed formatting process is executed in step S7. If the formatting is not instructed, the processing routine advances to the next process in an unformatted state as for the relevant partition. In step S6, an access management set-up process is executed as necessary. In the access management set-up process, the medium management set-up picture planes 132 as shown in FIGS. 19 to 21 are used and with respect to each of the medium management information 52 and access management information 76, the registration, change, erasure, or the like of the password and access code is set on a partition unit basis. The processing routine advances to step S8 in FIG. 30B. When the input/output request is issued to the MO drive 20A, the write or read input/output command is generated in step S9. If the security code is discriminated and there is a request of the password in step S10, a password input transfer is executed in step S11. The transfer process of the input/output command accompanied with the password in steps S8 to S11 is the same as that in steps S6 to S9 in FIGS. 18A and 18B. For example, when the file preservation window 172 is opened in the editor picture plane 170 as shown in FIG. 22 and the execute key 174 is pressed, the password request window 176 as shown in FIG. 23 is opened. By inputting a password by the user, the input/output request of the write command or read command associated with the user set password is performed. Further, when the input/output request to the MO drive is normally finished in step S12 in FIG. 30B, the processing routine advances to another process in step S14. If it is not normally finished, an error process is performed in step S13. The processes from step S8 are repeated until the apparatus receives an end instruction responsive to the power-off in step S15. The access management set-up process in step S7 in FIG. 30A can be also executed at an arbitrary timing as necessary for a period of time during the processes in steps S8 to S15.

According to the invention as mentioned above, the access kinds have been managed as medium management information in the storing apparatus in association with a plurality of data areas, for instance, partitions in the storing medium. Even if the password which is used for security access is illegally obtained, unless a correspondence relation indicating to which partition in the medium the password relates is known, the security cannot be cancelled. A higher data security can be assured as compared with the case where the security is held as a whole medium.

The management of all of the access kinds of the reading, reading/writing, and security corresponding to the data areas in the medium is performed on the storing apparatus side. The burden on the upper apparatus with regard to the access management of the medium can be remarkably reduced.

Even in the same medium, a different access format such as read access, write/read access, or security access in which a password is necessary can be arbitrarily determined as necessary in dependence on the data area and the optimum medium management can be performed in accordance with the contents of data to be recorded.

Either the mode in which the password is needed every time (password indispensable mode) or the mode in which the password is necessary only at the first time and no password is needed at the second and subsequent times (initial password mode) can be selected by the flag with respect to the security access. Thus, the input format of the password by the user can be properly selected as necessary.

When the collation dissidence of the password is decided in the storing apparatus by the access by the read command or write command to the medium preservation data accompanied with the password, it is regarded that the access is illegal. The process to delete the preservation data of the partition serving as an illegal access target is executed. The leakage of data can be certainly prevented.

The whole management responsive to the access request from the upper apparatus using the passwords corresponding to a plurality of partitions is executed on the storing apparatus side and the burden of the upper apparatus can be remarkably reduced.

Further, in addition to the access code, the partition information indicative of the presence or absence of the partitions, the bootable information showing the presence or absence of the boot program, and further, the format information indicative of the format of the partitions are formed and sent as medium management information to be transferred to the upper apparatus, so that the upper apparatus can establish the accessible state of the storing apparatus without performing any special operation such as reading analysis or the like of the medium. The upper apparatus can easily cope with various kinds of formats on the medium side divided into the partitions.

In the embodiment, although the MO drive has been mentioned as an example of the storing apparatus of the removable medium, the invention is not limited to it but can be also applied as it is to an apparatus using a proper removable medium such as magnetic tape apparatus, CD drive, DVD drive, FD drive, or the like. The invention can be applied as it is to not only the removable medium but also a fixed medium such as a hard disk drive. Although the ATA interface and ATAPI interface have been used as examples of the interface of the MO drive, the invention can also obviously support other various interfaces such as IDE, SCSI, UBS, IEEE1394, and the like.

Further, the invention is not limited to the foregoing embodiments but incorporates various proper modifications within the scope without losing the objects and advantages of the invention. The invention is not limited by the numerical values of the embodiments.

What is claimed is:

1. A storing apparatus using a storing medium comprising:
    a medium information reading unit for reading out prerecorded system information and access management information from a predetermined area of said storing medium when said storing medium is inserted;
    a medium management information forming unit for forming medium management information, into a memory, including a password and/or an access kind code which is used for access permission of each of a plurality of logically divided data areas in said storing medium and bootable information indicative of the presence or absence of a boot program that is necessary for a boot process of said apparatus, in correspondence to said plurality of data areas by said system information and said access management information; and
    a command processing unit for, when an access request command is received from an upper apparatus, discriminating a permission and an inhibition of the access for an address and the access kind of said access request command with reference to said medium management information, for executing said access request command if the access is possible, and for reporting an error if the access is inhibited.

2. An apparatus according to claim 1, wherein said system information is recorded in a predetermined logic block address in the data area of said storing medium and said access management information is recorded in an area which is other than a user area of said storing medium and which cannot be expressed by said logic block address.

3. An apparatus according to claim 1, wherein said access kind code is any one of a read access code in which only a read access is permitted, a read/write access code in which both of the read access and a write access are permitted, and a security code in which the access is permitted only when a collation coincidence of the password is obtained.

4. An apparatus according to claim 3, wherein in the case where a received password coincides with the password in the designated data area in said medium management information, said command processing unit updates the access kind code in said medium management information.

5. An apparatus according to claim 3, wherein as said access management information, the password and access kind code for every said data area have previously been recorded in said storing medium.

6. An apparatus according to claim 5, wherein when a received password coincides with the password in the designated data area, said command processing unit updates the access kind code in the access management information recorded in said storing medium.

7. An apparatus according to claim 3, wherein a flag is added to said security code and either a password indispensable mode in which a password is needed every access or an initial password mode in which a password is needed in the first access and no password is necessary at the second and subsequent times is selected by said flag.

8. An apparatus according to claim 3, wherein when the access request command is received for the data area in which said security code has been set, said command processing unit deletes said data area in the case where a collation coincidence of the password is not obtained.

9. An apparatus according to claim 1, wherein when the medium is ejected or when a power source of the apparatus is turned off, said medium management information forming unit clears the medium management information formed on the memory.

10. An apparatus according to claim 1, wherein said medium management information forming unit divides a medium area into one or a plurality of partitions and forms said medium management information.

11. An apparatus according to claim 1, wherein as said medium management information, said medium management information forming unit further forms format information indicative of a kind of format in each data area.

12. A storage control method using a storing medium, comprising:
    a medium information reading step of reading out system information and access management information from a predetermined area of said storing medium when said storing medium is inserted;
    a medium management information forming step of forming medium management information into a memory, including a password and/or an access kind code which is used for access permission of each of a plurality of logically divided data areas in said storing medium and bootable information indicative of the presence or absence of a boot program that is necessary for a boot process of said apparatus, in correspondence to said plurality of data areas by said system information and said access management information; and
    a command processing step of, when an access request command is received, discriminating a permission and an inhibition of the access for an address and the access kind of said access request command with reference to said medium management information, executing said access request command if the access is possible, and reporting an error if the access is inhibited.

13. A method according to claim 12, wherein said system information is recorded in a head logic block address of said storing medium and said access management information is recorded in an area which is other than a user area of said storing medium and which cannot be shown by a logic block address.

14. A method according to claim 12, wherein in said command processing step, when the access kind code is received together with the password from an upper apparatus, in the case where said password coincides with the password in the designated data area in said medium management information, the access kind code in said medium management information is updated.

15. A method according to claim 12, wherein in said command processing step, in the case where a received password coincides with the password in the designated data area, the access kind code in said storing medium is updated.

* * * * *